(12) United States Patent
Yoshida et al.

(10) Patent No.: US 8,422,892 B2
(45) Date of Patent: Apr. 16, 2013

(54) IMAGE FORMING APPARATUS, IMAGE FORMING METHOD, AND COMPUTER-READABLE RECORDING MEDIUM HAVING IMAGE FORMING PROGRAM RECORDED THEREIN

(75) Inventors: Minoru Yoshida, Tokyo (JP); Yoshiaki Kaneko, Shizuoka-ken (JP); Osamu Takagi, Tokyo (JP); Takahito Kabai, Shizuoka-ken (JP); Hiroyuki Taguchi, Shizuoka-ken (JP); Ken Iguchi, Shizuoka-ken (JP); Hiroshi Hashidume, Tokyo (JP); Makoto Tani, Kanagawa-ken (JP); Takahisa Hirano, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 416 days.

(21) Appl. No.: 12/767,535

(22) Filed: Apr. 26, 2010

(65) Prior Publication Data
US 2010/0272449 A1 Oct. 28, 2010

Related U.S. Application Data

(60) Provisional application No. 61/173,104, filed on Apr. 27, 2009, provisional application No. 61/173,106, filed on Apr. 27, 2009, provisional application No. 61/242,996, filed on Sep. 16, 2009.

(51) Int. Cl.
*G03G 15/00* (2006.01)
(52) U.S. Cl.
USPC ............................................................. 399/2
(58) Field of Classification Search ................ 399/2, 38, 399/107
See application file for complete search history.

(56) References Cited

U.S. PATENT DOCUMENTS

| | | | |
|---|---|---|---|
| 7,957,660 B2* | 6/2011 | Kaneko et al. .................. | 399/67 |
| 2007/0177204 A1 | 8/2007 | Kamasuka et al. | |
| 2008/0013970 A1* | 1/2008 | Kikuchi ........................... | 399/45 |
| 2010/0196063 A1* | 8/2010 | Iguchi et al. .................. | 399/322 |

FOREIGN PATENT DOCUMENTS

| | | |
|---|---|---|
| EP | 1327528 | 7/2003 |
| JP | 2000-246999 A | 9/2000 |
| JP | 2003-034080 | 2/2003 |

OTHER PUBLICATIONS

European Search Report dated Jul. 28, 2010 from counterpart European Patent Application No. 101609170-1228.
U.S. Appl. No. 12/699,286, Iguchi.

* cited by examiner

*Primary Examiner* — Walter L Lindsay, Jr.
*Assistant Examiner* — Rodney Bonnette
(74) *Attorney, Agent, or Firm* — Patterson & Sheridan, LLP

(57) ABSTRACT

There is provided an image forming apparatus including: an image data acquiring unit that acquires image data of an image formed on a sheet; an identification information acquiring unit that acquires identification information that identifies the sheet on which the image is formed; an image forming unit that forms an image based on the image data on the sheet with a decolorable colorant which becomes colorless by a predetermined chemical reaction and that forms an identification information image based on the identification information on the sheet with a non-decolorable colorant which does not become colorless by the chemical reaction; and a storage control unit that stores the identification information and the image data of the image to be formed on the sheet, on which the identification information image corresponding to the identification information is formed, in a predetermined storage region in a correlated manner.

20 Claims, 22 Drawing Sheets

FIG. 4

| IDENTIFICATION INFORMATION | IMAGE DATA | | PRINT DATA |
|---|---|---|---|
| 1000 | 1 | 10001.jpeg | 01/30/2009 |
| | 2 | 10002.jpeg | 03/15/2009 |
| 1001 | 1 | 10011.jpeg | 02/07/2009 |
| 1002 | 1 | 10021.jpeg | 03/10/2009 |
| | 2 | 10022.jpeg | 04/14/2009 |
| | 3 | 10023.jpeg | 10/05/2009 |
| | 4 | 10024.jpeg | 02/25/2010 |
| ⋮ | | ⋮ | ⋮ |

IMAGE FORMING APPARATUS, IMAGE FORMING METHOD, AND COMPUTER-READABLE RECORDING MEDIUM HAVING IMAGE FORMING PROGRAM RECORDED THEREIN

CROSS-REFERENCE TO RELATED APPLICATION

This application is based upon and claims the benefit of priority from: U.S. provisional application 61/173,104, filed on Apr. 27, 2009; U.S. provisional application 61/173,106, filed on Apr. 27, 2009; and U.S. provisional application 61/242,996, filed on Sep. 16, 2009; the entire contents of each of which are incorporated herein by reference.

TECHNICAL FIELD

The description relates to a technique of reproducing images when an image forming apparatus forms an image using a decolorable colorant which is made colorless with thermal energy or the like, and the image is decolored, and accordingly, the image disappears.

BACKGROUND

Conventionally, a decolorable colorant capable of erasing colors, such as ink containing a leuco dye was used to print images on a paper in order to reuse papers on which images were printed by an image forming apparatus such as MFP (Multi-Function Peripheral). The paper printed with the decolorable colorant can be reused for printing since a chemical reaction occurs therein when heat or the like is applied thereto, thus decoloring the decolorable colorant.

However, when printing is performed using a colorant which is made colorless with heat or the like in order to make a paper reusable, it is difficult to maintain images for a longer period of time compared to a printing method that uses a general non-decolorable toner and ink and the like. For example, when a paper printed with a colorant which is made colorless with heat is left in a place such as an inside of a vehicle that is heated in the summer season, the image on the paper will be decolored, and accordingly, the information printed on the paper will disappear. In addition, when a user carelessly performs processes that erase images printed with a decolorable colorant with the aim to recycle a paper, the printed information will disappear.

Moreover, another problem is the difficulty to discriminate at a glance between an image printed with a decolorable colorant and an image printed with a general non-decolorable colorant. Therefore, when a user tried to reuse a printed paper, it was difficult to determine whether the printed paper could be reused when the images on the paper are decolored.

SUMMARY

The description relates to an image forming apparatus including: an image data acquiring unit that acquires image data of an image formed on a sheet; an identification information acquiring unit that acquires identification information that identifies the sheet on which the image is formed; an image forming unit that forms an image based on the image data acquired by the image data acquiring unit on the sheet with a decolorable colorant which becomes colorless by a predetermined chemical reaction and that forms an identification information image based on the identification information on the sheet with a non-decolorable colorant which does not become colorless by the chemical reaction by which the decolorable colorant becomes colorless; and a storage control unit that stores the identification information and the image data of the image to be formed on the sheet, on which the identification information image corresponding to the identification information is formed, in a predetermined storage region in a correlated manner.

The description also relates to an image forming method including: acquiring image data of an image formed on a sheet; acquiring identification information that identifies the sheet on which the image is formed; forming an image based on the acquired image data on the sheet with a decolorable colorant which becomes colorless by a predetermined chemical reaction and forming an identification information image based on the identification information on the sheet with a non-decolorable colorant which does not become colorless by the chemical reaction by which the decolorable colorant becomes colorless; and storing the identification information and the image data of the image formed on the sheet, on which the identification information image corresponding to the identification information is formed, in a predetermined storage region in a correlated manner.

The description further relates to a computer-readable recording medium having an image forming program recorded therein, the program causing a computer to execute processing including: acquiring image data of an image formed on a sheet; acquiring identification information that identifies the sheet on which the image is formed; forming an image based on the acquired image data on the sheet with a decolorable colorant which becomes colorless by a predetermined chemical reaction and forming an identification information image based on the identification information on the sheet with a non-decolorable colorant which does not become colorless by the chemical reaction by which the decolorable colorant becomes colorless; and storing the identification information and the image data of the image formed on the sheet, on which the identification information image corresponding to the identification information is formed, in a predetermined storage region in a correlated manner.

DESCRIPTION OF THE DRAWINGS

FIG. 4 is a diagram showing a data structure of an image data DB stored in an HDD.

DETAILED DESCRIPTION

Hereinafter, embodiments will be described with reference to the drawings.

First Embodiment

Figure 1:
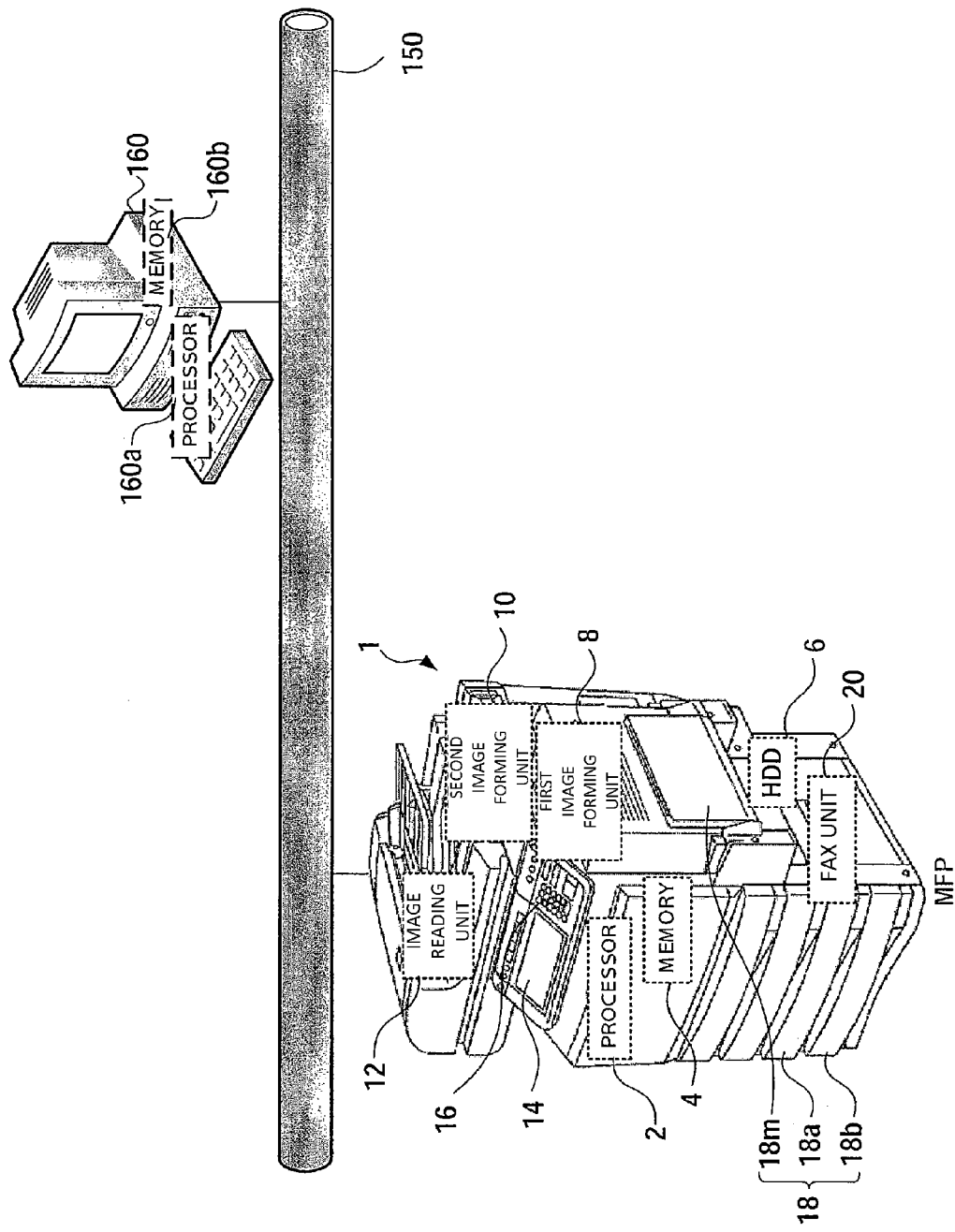
FIG. 1 is a diagram showing the configuration of an MFP serving as an image forming apparatus according to a first embodiment and the configuration of a system including the MFP.
Figure 2:
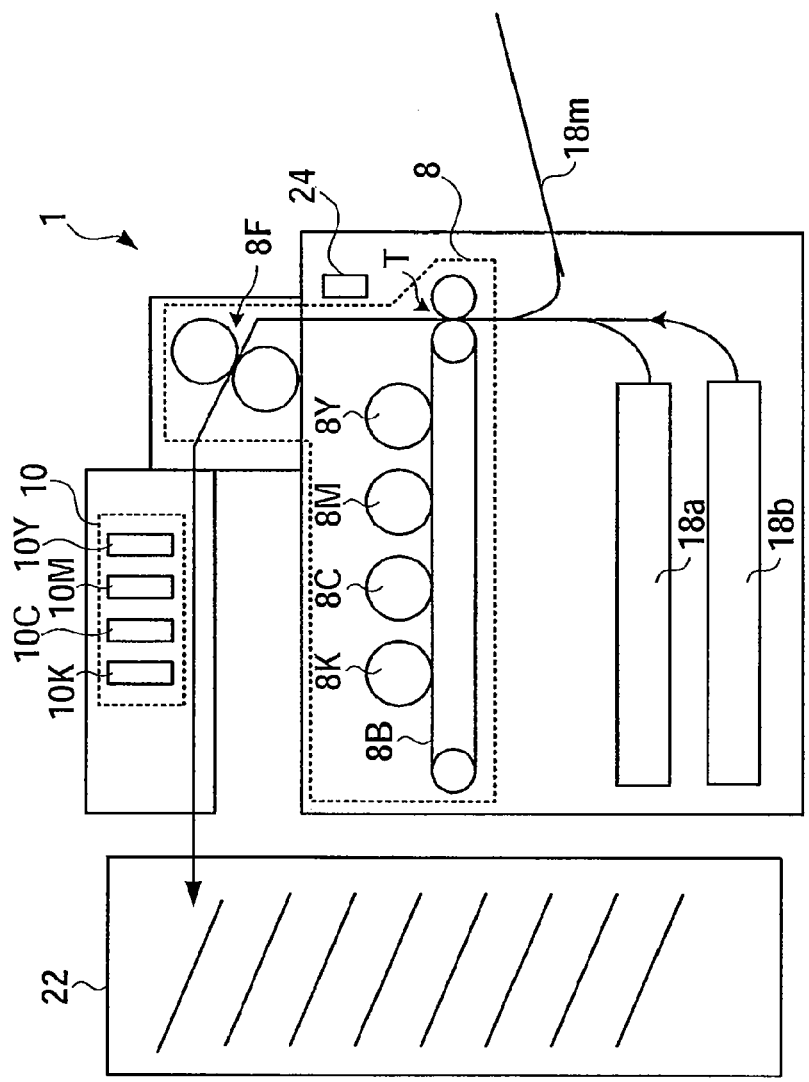
FIG. 2 is a diagram showing the configuration of the MFP according to the first embodiment.

FIG. 1 is a diagram showing the configuration of an MFP (Multi-Function Peripheral) 1 serving as an image forming apparatus according to the present embodiment and the configuration of a system including the MFP 1. FIG. 2 is a diagram showing the configuration of the MFP 1 according to the present embodiment. The system of the present embodiment has a configuration in which the MFP 1 and other devices such as a client terminal 160 are connected via a network 150. Each device constituting the system will be described in detail below.

The MFP 1 of the present embodiment is an MFP capable of performing two kinds of image forming processes: one image forming process uses a decolorable colorant which becomes colorless by a chemical reaction when it is heated to a predetermined temperature, and the other image forming process uses a non-decolorable colorant which maintains its color even after it is heated to the predetermined temperature. In the following, a mode wherein images are formed with a decolorable colorant will be referred to as a "rewritable print mode" (however, the image forming process using the decolorable colorant is not limited to the case of aiming at the reuse of the sheet).

The MFP 1 of the present embodiment performs processes of forming images with a decolorable colorant to enable the reuse of a sheet, forming an identification information image corresponding to identification information for identifying the sheet with a non-decolorable colorant, and storing the identification information and image data formed by the decolorable colorant in a predetermined storage region in a correlated manner. By doing so, even when the image formed with the decolorable colorant is carelessly decolored, and accordingly, information formed on the sheet disappears, the MFP 1 of the present embodiment is able to reproduce the decolored images to reappear on the sheet by using the identification information image corresponding to the identification information formed on the sheet. In the following, a mode wherein decolored images are formed on the sheet again by using the identification information will be referred to as a "reproduction mode."

Hereinafter, components realizing these functions of the MFP 1 according to the present embodiment will be described.

The MFP 1 includes a processor 2, a memory 4, an HDD (Hard Disc Drive) 6, a first image forming unit 8 that forms images using a non-decolorable colorant, a second image forming unit 10 that forms images using a decolorable colorant, an image reading unit 12, a display panel 14, an operation input unit 16, a sheet supply unit 18, a FAX unit 20, a finisher device 22, an image reading sensor 24, and the like.

The processor 2 executes various processes of the MFP 1 such as, for example, an image forming process and an image reading process, based on a print job, an operation input, and the like sent from the client terminal 160 or the like. When images are formed in the rewritable print mode, namely images are formed using a decolorable colorant in order to enable the reuse of a sheet, the processor 2 of the present embodiment controls a process of causing the first image forming unit 8 to form an identification information image on a sheet using a non-decolorable colorant and causing the second image forming unit 10 to form an image with image data acquired as an image forming job on the sheet using a decolorable colorant. In addition, the processor 2 executes a process of storing the image data formed with the decolorable colorant and the identification information on the sheet in the HDD 6 in a correlated manner. In addition, as the image forming process in the reproduction mode, the processor 2 executes a process of acquiring disappeared image data from the identification information image that is formed on the sheet and forming an image with the image data on the sheet based on an instruction from the operation input unit 16 or the like to reproduce decolored images. The processor 2 executes processing for realizing these various functions by executing a program stored in the memory 4. Details of the function executing the above-described processes will be described with reference to the functional block diagram of FIG. 3. Moreover, as the processor 2, a CPU (Central Processing Unit), an MPU (Micro Processing Unit) capable of executing the same arithmetical processing as the CPU, and the like can be used. Furthermore, a part or the entirety of the functions of the MFP 1 may be implemented as an ASIC (Application Specific Integrated Circuit) serving as a processor.

The memory 4 stores programs for executing the image forming process and the above-described processes of the MFP 1 according to the present embodiment. Moreover, the memory 4 is used for temporarily storing image data generated by RIP processing during the image forming process and as work areas of various applications. In addition, the memory 4 has a function of temporarily storing signals such as an image forming job acquired via the network 150, operation input signals from the operation input unit 16, and the like. The memory 4 can be configured, for example, by a RAM (Random Access Memory), a ROM (Read Only Memory), a DRAM (Dynamic Random Access Memory), an SRAM (Static Random Access Memory), a VRAM (Video RAM), a flash memory, and the like.

The HDD 6 is an auxiliary storage device for storing various kinds of information of the MFP 1. In addition, the HDD 6 of the present embodiment stores an image data database (DB) 100 in which the identification information for identifying a sheet on which an image is formed with a decolorable colorant and the formed image data are stored in a correlated manner. Although in the present embodiment, an HDD is exemplified as an example of the auxiliary storage device of the MFP 1, the auxiliary storage device is not limited to this, but for example, a flash memory, an SSD (Solid-State Device), a magnetic disk other than the HDD, and the like may be used.

The first image forming unit 8 is a device that forms images by a general electrophotographic method. The first image forming unit 8 of the present embodiment forms an identification information image corresponding to sheet identification information when images are formed in the rewritable print mode. As shown in FIG. 2, the first image forming unit 8 includes photoconductive drums 8K, 8C, 8M, and 8Y, an intermediate transfer belt 8B, a fixing device 8F, and the like.

The photoconductive drums 8K to 8Y form electrostatic latent images corresponding to color data of each of the colors black (K), cyan (C), magenta (M), and yellow (Y) constituting the image data to be formed on the photoconductive surface of each of the photoconductive drums 8K to 8Y, and the electrostatic latent images are made visible as developer images by a developer (toner) supplied from a developing roller not shown. The developer images formed on the photoconductive drums 8K to 8Y are transferred (so-called primarily transferred) to the intermediate transfer belt 8B.

The intermediate transfer belt 8B transfers (so-called secondarily transfers) the transferred developer images to a sheet serving as an image forming target at a transfer position T shown in FIG. 2.

The fixing device BF thermally fixes the developer images transferred to the sheet at the transfer position T to the sheet.

Here, "identification information" is information for identifying a sheet on which an image is formed, and in the present embodiment, is information for identifying a sheet on which an image is formed in the rewritable print mode in order to correlate the image data based on which an image is formed in the rewritable print mode to a sheet on which an image is formed based on the image data. Moreover, "identification information image" is an image that is formed on a sheet corresponding to the identification information. For example, the identification information is a character string made up of numbers, characters, and the like, and the identification information image is an image that can be read by an image reading sensor, such as a barcode or a QR code (registered trademark) representing the identification information. Identification information itself of a character string may be used as the identification information image as long as the identification information of the character string can be read. In the image data DB 100 described later, the identification information and the image data based on which an image is formed with a decolorable colorant are stored in a correlated manner, so that it is possible to identify image data based on which an image is formed on the sheet from the identification information identified by reading an identification information image corresponding to the identification information.

The second image forming unit 10 is a device that forms images by an ink jet method using a decoloring ink which is a decolorable colorant. In the present embodiment, the second image forming unit 10 forms an image of image data acquired as an image forming job when images are formed in the rewritable print mode. The second image forming unit 10 includes print heads 10K, 10C, 10M, and 10Y which correspond to the decoloring inks of each of the colors black (K), cyan (C), magenta (M), and yellow (Y), and corresponding inks are discharged from the print heads so that decoloring ink images are formed on a sheet.

Here, the decoloring ink which is a decolorable colorant may be a dye such as a leuco dye. The decoloring ink becomes colorless when it is heated to a temperature of about 80 to 100° C.

The image reading unit 12 is a general image reading device which is provided to a copying machine, an image scanner, and the like. The image reading unit 12 is used when a user copies or scans an original document using the MFP 1.

The display panel 14 displays various kinds of information such as setting information, operation status, and the like of the MFP 1. The display panel 14 can be configured, for example, by an electronic paper, an LCD (Liquid Crystal Display), an EL (Electronic Luminescence), a PDP (Plasma Display Panel), a CRT (Cathode Ray Tube), and the like. Moreover, when the display panel 14 is configured by a touch panel display, the display panel 14 can implement a part or the entirety of the functions of the operation input unit 16.

The operation input unit 16 is used for designating copying and scanning conditions and inputting FAX Numbers. The operation input unit 16 can be configured, for example, by input keys for numbers or the like, a keyboard, a mouse, a touch panel, a touchpad, a graphics tablet, and dedicated buttons.

The sheet supply unit 18 stores sheets such as papers on which an image is formed and supplies the stored sheet to the image forming unit when forming images. The sheet supply unit 18 of the present embodiment includes a sheet supply unit 18a in which unused sheets on which an image is not formed yet at all are stored, a reused sheet supply unit 18b in which reused sheets are stored which have been subjected to a decoloring process for reuse so that images disappear, and a manual supply unit 18m. Since the reused sheets stored in the reused sheet supply unit 18b are sheets on which images had been formed with a decolorable colorant, identification information is attached to the sheets, and an identification information image corresponding to the identification information is formed at a predetermined position of each of the sheets. Moreover, in the MFP 1 of the present embodiment, when images are formed in the reproduction mode, sheets having decolored images are stored in the manual supply unit 18m and supplied from the manual supply unit 18m to the image forming unit.

The FAX unit 20 is an apparatus that sends and receives facsimile signals in the MFP 1.

The finisher device 22 is a device for sorting sheets into each copy when printing multiple copies. Moreover, the finisher device 22 is also capable of performing the role of a discharge unit that stores discharged sheets.

The image reading sensor 24 reads the identification information image printed at a predetermined position of a reused sheet when the reused sheet is supplied from the reused sheet supply unit 18b and images are formed thereon. Moreover, when in the reproduction mode, a decolored image is formed on a sheet again on which the image had been formed, the image reading sensor 24 reads the identification information image that was formed on the sheet with a non-decolorable colorant. Identification information is acquired from the identification information image read by the image reading sensor 24, and image data correlated to the acquired identification information are identified from the image data DB 100, whereby the image can be reproduced by forming the image data on the sheet again.

The configuration of the MFP 1 was described hereinabove.

Next, other system configurations shown in FIG. 1 other than the MFP 1 will be described. The network 150 is a communication network that is configured, for example, by the Internet, a LAN (Local Area Network), and a WAN (Wide Area Network).

The client terminal 160 connected to the network 150 outputs an image forming job such as a PDL file to the MFP 1 via the network 150. The client terminal 160 is a terminal device such as a computer. The client terminal 160 includes a processor 160a, a memory 160b, and the like, and is capable of realizing various functions by executing programs stored in the memory 160b or the like.

Next, the image forming function of the MFP 1 according to the present embodiment will be described.

Figure 3:
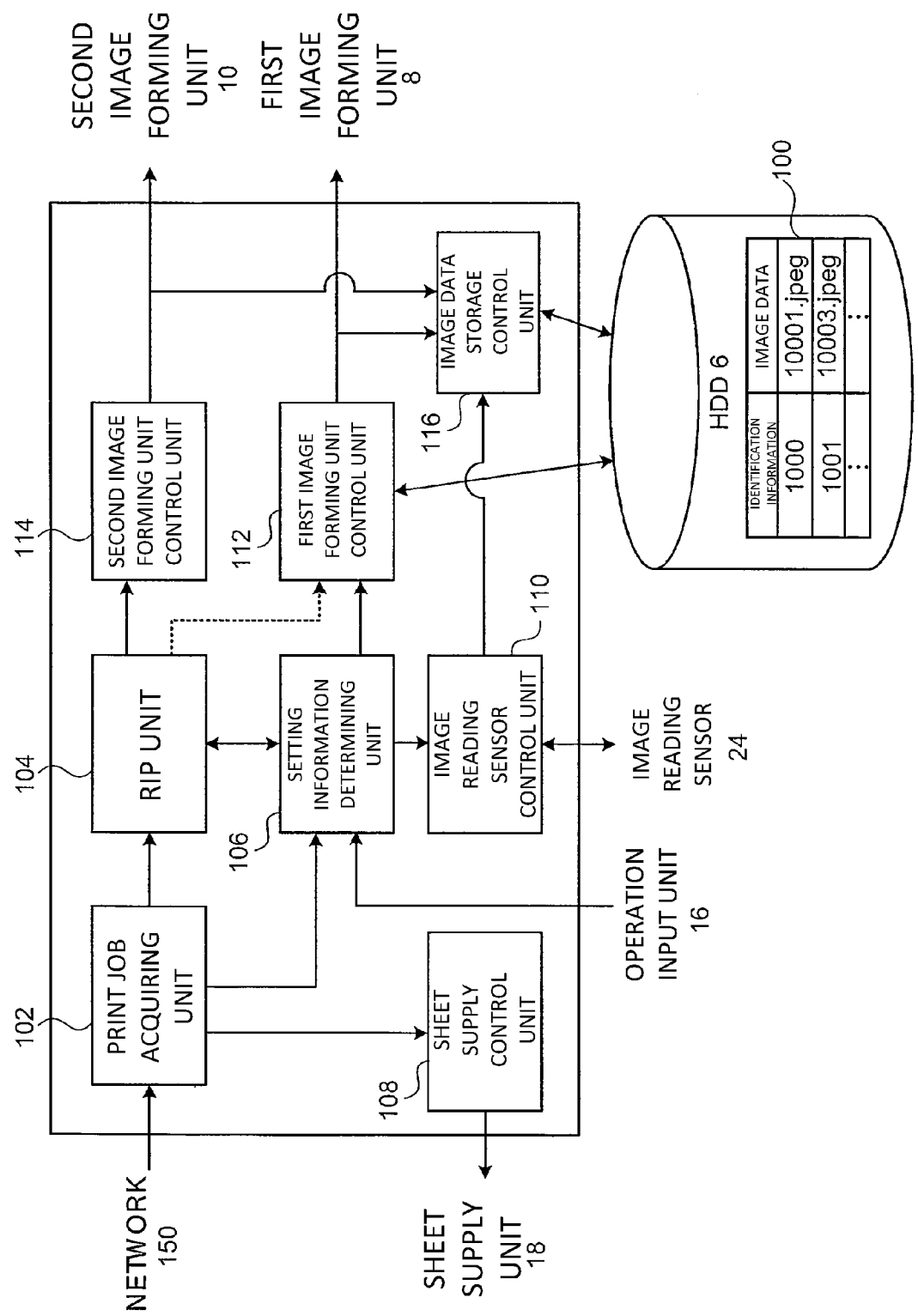
FIG. 3 is a functional block diagram showing functional blocks of the MFP.

First, among the image forming processes of the MFP 1 according to the present embodiment, an image forming process based on an image forming job will be described. FIG. 3 is a functional block diagram showing functional blocks of the MFP 1. The functional blocks below are implemented when the processor 2 reads and executes image forming programs stored in the memory 4 and the HDD 6.

The MFP 1 of the present embodiment includes a print job acquiring unit 102, an RIP unit 104, a setting information determining unit 106, a sheet supply control unit 108, an image reading sensor control unit 110, a first image forming unit control unit 112, a second image forming unit control unit 114, and an image data storage control unit 116.

The print job acquiring unit 102 acquires an image forming job that instructs to form images and that is sent from the client terminal 160 or the like via the network 150. The print job may contain the following information: a PDL (Page Description Language) file based on which an image is formed, setting information designating whether or not image formation will be performed in the rewritable print mode, setting information as to from which supply unit of the sheet supply unit 18 a sheet will be supplied, and the like.

The RIP unit 104 is an RIP (Raster Image Processor) that executes a process of interpreting a PDL file constituting the print job and converting the PDL file into raster image data. When the rewritable print mode is set, the RIP unit 104 outputs the raster image data to the second image forming unit control unit 110 in order to form images with a decolorable colorant. On the other hand, when the rewritable print mode is not set, and images are formed with a general non-decolorable colorant, the RIP unit 104 outputs the raster image data to the first image forming unit control unit 112 (see the dotted line in FIG. 3).

The setting information determining unit 106 determines whether or not it is set such that images will be formed in the rewritable print mode when the MFP 1 acquires a print job. Specifically, when information designating that images will be formed in the rewritable print mode is included in the print job, the setting information determining unit 106 determines that images will be formed in the rewritable print mode and causes the RIP unit 104 to output raster image data to the second image forming unit control unit 110. Moreover, when it is preset by an operation input on the operation input unit 16 or the like such that images will be formed in the rewritable print mode, the setting information determining unit 106 may similarly determine that images will be formed in the rewritable print mode and cause the raster image data to be output to the second image forming unit control unit 110. Furthermore, the setting information determining unit 106 determines whether it is set such that a sheet will be supplied from either the sheet supply unit 18a or the reused sheet supply unit 18b.

The setting information determining unit 106 determines based on the setting information as to the rewritable print mode and the setting information as to the sheet supply unit 18 whether a new identification information image will be formed on a sheet or an identification information image which was already formed on the sheet will be read. That is to say, if the rewritable print mode is set, and the sheet supply unit 18a storing unused sheets is set as the sheet supply unit, since the identification information image is not formed on the sheets on which an image will be formed later, the setting information determining unit 106 outputs an instruction to the first image forming unit control unit 112 to form an identification information image corresponding to new identification information. On the other hand, if the reused sheet supply unit 18b is designated, the setting information determining unit 106 outputs an instruction to the image reading sensor control unit 110 to cause the image reading sensor 24 to a process of reading an identification information image of a sheet that is transported for image formation.

The sheet supply control unit 108 executes a process of supplying a sheet from a designated sheet supply unit based on the above-described setting information as to the sheet supply unit 18 included in the print job.

As described above, the image reading sensor control unit 110 causes the image reading sensor 24 to execute a process of reading an identification information image formed on a reused sheet that is transported for image formation based on the determination results of the setting information determining unit 106.

When the setting information as to the sheet supply unit 18 is set such that sheets will be supplied from the sheet supply unit 18a, the first image forming unit control unit 112 executes a process of causing the first image forming unit 8 to form an identification information image corresponding to new identification information assigned to a sheet on which an image is to be formed with a non-decolorable colorant. In this case, the first image forming unit control unit 112 generates new identification information so as to be different from the identification information that was already stored by referencing the image data DB 100 stored in the HDD 6 (this generating operation corresponds to the function of an identification information acquiring unit), generates an identification information image corresponding to the identification information, forms the identification information image on a sheet, and causes the first image forming unit 8 to perform image formation. In this case, the first image forming unit control unit 112 controls such that the identification information image is formed in a predetermined region (for example, a header region or a footer region of a sheet) different from an image region of a sheet in which images are formed by the second image forming unit 10.

Specifically, if serial numbers starting from "1000" are attached as identification information, and identification information up to "1010" was registered when the first image forming unit control unit 112 referenced the image data DB 100, the first image forming unit control unit 112 will generate "1011" as the identification information and generate an identification information image such as a barcode corresponding to "1011."

When the rewritable print mode is designated, the second image forming unit control unit 114 executes a process of causing the second image forming unit 10 to form the raster image data generated by the RIP unit 104 with a decoloring ink which is a decolorable colorant.

The image data storage control unit 116 stores the image data based on which an image is formed by the second image forming unit 10 in the image data DB 100 to be correlated to new identification information generated by the first image forming unit control unit 112 or identification information that was registered in the image data DB 100 and that corresponds to the identification information image read by the image reading sensor 24.

Next, a data structure of the image data DB 100 will be described. FIG. 4 is a diagram showing the data structure of the image data DB 100 stored in the HDD 6. In the image data DB 100, for example, as shown in FIG. 4, identification information, corresponding image data, the date and time when an image is formed on a sheet based on the image data, and the like are stored in a correlated manner. If images were formed plural times on the same sheet in the rewritable print mode, these past plural images may be stored in the image data DB 100. For example, the sheet having identification information of 1002 in FIG. 4 was formed with the first image data (10021.jpeg) on Mar. 10, 2009, and was recycled later for forming images up to four times. When images were formed plural times on the same sheet, it is not always necessary to store all of the past image data, but a storage period, the number of data items, or the like may be changed as necessary.

When an image is formed based on the image data acquired as the image forming job with a decolorable colorant by the above-described functions of the MFP 1, it is possible to form an identification information image corresponding to sheet identification information identifying a sheet on a sheet on which an image is formed with a non-decolorable colorant. Therefore, it is possible to store the identification information corresponding to the identification information image and the image data based on which an image is formed with the decolorable colorant in a correlated manner.

Figure 5:
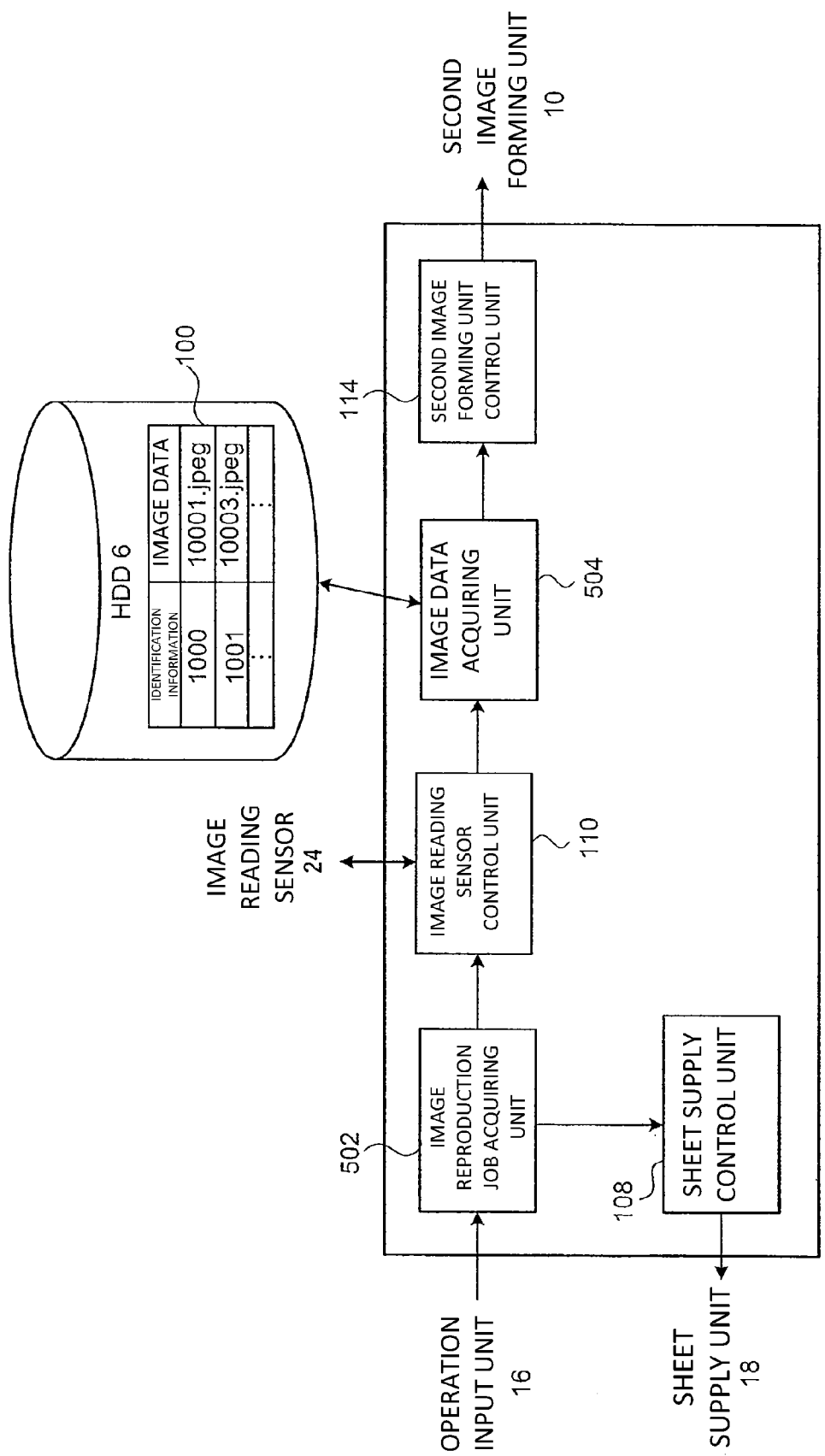
FIG. 5 is a functional block diagram showing image forming functional blocks in the reproduction mode of the MFP.

Next, among the image forming processes of the MFP 1 according to the present embodiment, the image forming process in the reproduction mode will be described. FIG. 5 is a function block diagram showing functional blocks in the reproduction mode of the MFP 1. Similarly, the functional blocks below are implemented when the processor 2 reads and executes image forming programs stored in the memory 4 and the HDD 6.

The MFP 1 of the present embodiment includes an image reproduction job acquiring unit 502, the sheet supply control unit 108, the image reading sensor control unit 110, an image data acquiring unit 504 serving as a stored image data acquiring unit, and the second image forming unit control unit 114.

The image reproduction job acquiring unit 502 acquires, from the operation input unit 16 or the like, a print job in the reproduction mode that instructs the execution of a process of reproducing an image that was decolored and disappeared.

The sheet supply control unit 108 executes a process of supplying sheets from the manual supply unit 18*m* when the image reproduction job acquiring unit 502 acquires the print job in the reproduction mode. This is to form again the disappeared image on the original sheet from which the image disappeared.

The image reading sensor control unit 110 executes a process of causing the image reading sensor 24 to read an identification information image formed on the sheet supplied from the manual supply unit 18*m*.

The image data acquiring unit 504 references the image data DB 100 stored in the HDD 6 based on the identification information read by the image reading sensor 24 under the control of the image reading sensor control unit 110 to acquire the nearest image data that correspond to the decolored image and that are correlated to the identification information. If plural image data are stored for each of the identification information in the image data DB 100, any past image data may be reproduced in addition to the latest image. This can be realized, for example, by displaying a list of image data corresponding to the acquired identification information on the display panel 14 and allowing a user to select data to be reproduced through an operation on the operation input unit 16.

The second image forming unit control unit 114 executes a process of causing the second image forming unit 10 to form the image data acquired by the image data acquiring unit 504 on a sheet.

By the above-described functions of the MFP 1 according to the present embodiment, even when a colorant on a sheet is decolored, and accordingly, an image disappears, it is possible to reproduce the decolored image on the sheet again using the identification information image formed with the non-decolorable colorant.

Although the above-described functional blocks were described to be implemented when the processor 2 reads the image processing programs stored in the memory 4 or the like, the invention is not limited to this, but a part of the functional blocks may be implemented by a processing circuit such as an ASIC (Application Specific Integrated Circuit) or may be implemented by a processing circuit such as an ASIC having the entirety of the functional blocks.

Figure 6:
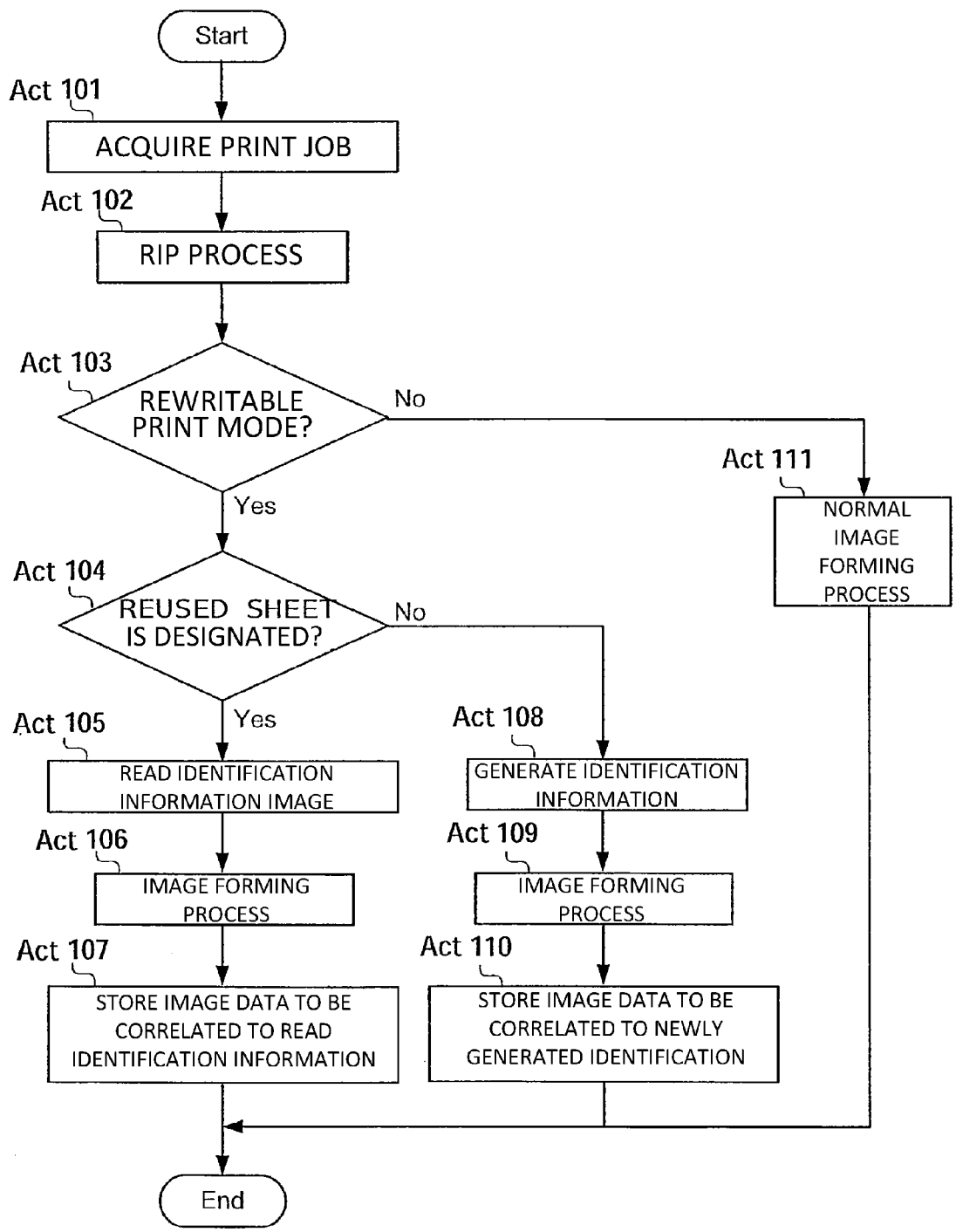
FIG. 6 is a flowchart showing the flow of an image forming process in the rewritable print mode of the MFP.

Next, the flow of the image forming process in the rewritable print mode by the MFP 1 will be described. FIG. 6 is a flowchart showing the flow of the image forming process in the rewritable print mode of the MFP 1.

First, in Act 101, the print job acquiring unit 102 acquires a print job via the network 150.

Subsequently, in Act 102, the RIP unit 104 rasterizes a PDL file included in the acquired print job.

Subsequently, in Act 103, the setting information determining unit 106 determines whether or not the rewritable print mode is set based on the setting information included in the print job. When it is determined that the rewritable print mode is set (Act 103: Yes), the setting information determining unit 106 determines in Act 104 whether or not it is set in the setting information included in the print job or by an operation input on the operation input unit 16 such that sheets will be supplied from the reused sheet supply unit 18*b*.

When it is determined that it is set such that a reused sheet will be supplied from the reused sheet supply unit 18*b* (Act 104: Yes), the image reading sensor control unit 110 executes, in Act 105, a process of causing the image reading sensor 24 to read an identification information image formed on a sheet supplied from the reused sheet supply unit 18*b*.

Subsequently, in Act 106, the second image forming unit control unit 114 causes the second image forming unit 10 to perform image formation based on raster image data generated by the RIP unit 104.

Subsequently, in Act 107, the image data storage control unit 116 stores the image data based on which an image is formed by the second image forming unit 10 and the identification information identified by the image reading sensor 24 reading the identification information image in the image data DB 100 in a correlated manner.

On the other hand, when the setting information determining unit 106 determines in Act 104 that it is set such that unused sheets will be supplied from the sheet supply unit 18*a* (Act 104: No), the first image forming unit control unit 112 generates, in Act 108, new identification information that was not registered by referencing the image data DB 100 of the HDD 6 in order to form a new identification information image on a sheet.

Subsequently, in Act 109, the first image forming unit control unit 112 causes the first image forming unit 8 to form an identification information image corresponding to the generated identification information on a sheet, and the second image forming unit control unit 114 causes the second image forming unit 10 to form an image on the sheet using the raster image data generated by the RIP unit 104.

Subsequently, in Act 110, the image data storage control unit 116 stores the image data based on which an image is formed by the second image forming unit 10 and the newly generated identification information in the image data DB 100 in a correlated manner.

The flow of the process of forming images in the rewritable print mode by the MFP 1 according to the present embodiment is described hereinabove. By the image forming processes of Acts 105 to 107, images are formed on a reused sheet with a decolorable colorant, whereas by the image forming processes of Acts 108 to 110, images generated by the RIP processing are formed on an unused sheet with a decolorable colorant and an identification information image is formed thereon with a non-decolorable colorant.

Moreover, when the setting information determining unit 106 determines in Act 103 that the rewritable print mode is not set in the print job (Act 103: No), the MFP 1 executes a normal image forming process using a non-decolorable colorant in Act 111.

Figure 7:
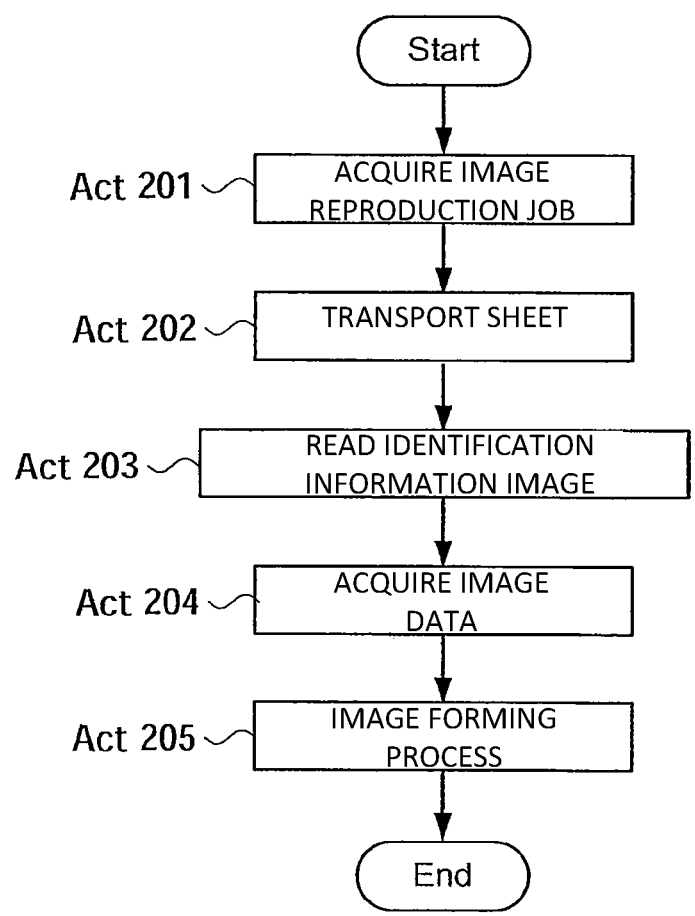
FIG. 7 is a flowchart showing the flow of an image forming process in the reproduction mode of the MFP.

Next, the flow of the process of forming images in the reproduction mode in order to reproduce a decolored image when an image on a sheet formed in the rewritable print mode in the described manner is decolored will be described. FIG. 7 is a flowchart showing the flow of the image forming process in the reproduction mode of the MFP 1.

First, a user places a sheet having a decolored image on the manual supply unit 18m and operates the operation input unit 16 to issue an instruction to execute an image forming process in the reproduction mode. Then, in Act 201, the image reproduction job acquiring unit 502 acquires an image reproduction job from the operation input unit 16.

Subsequently, when the image reproduction job is acquired in Act 201, the sheet supply control unit 108 causes, in Act 202, the sheet supply unit 18 to execute a process of supplying a sheet which is a target material for reproducing an image and which is placed on the manual supply unit 18m to the image forming unit.

Subsequently, in Act 203, the image reading sensor control unit 110 causes the image reading sensor 24 to execute a process of reading an identification information image formed in a predetermined region of a sheet being transported.

Subsequently, in Act 204, the image data acquiring unit 504 references the image data DB 100 based on the identification information identified from the identification information image read by the image reading sensor 24 to acquire image data that are the latest among the registered image data correlated to the identification information. For example, in the case of the image data DB 100 shown in FIG. 4, if the identification information is 1002, the reproduced image data will be "10024.jpeg" which is the latest data.

Subsequently, in Act 205, the second image forming unit control unit 114 executes a process of causing the second image forming unit 10 to form an image based on the image data acquired in Act 204 on a sheet.

By the above-described processes, it is possible to reproduce an image that was decolored and disappeared on a sheet having the decolored image using the identification information image formed with a non-decolorable colorant that remains colorful without being decolored.

As described above, according to the MFP 1 of the present embodiment, it is possible to form an image on a sheet with a decolorable colorant and form an identification information image on the sheet with a non-decolorable colorant. In addition, according to the MFP 1 of the present embodiment, it is possible to store image data based on which an image is formed with the decolorable colorant and sheet identification information in a correlated manner. In this way, even when an image formed with a decolorable colorant is carelessly decolored, it is possible to read the identification information image formed with the non-decolorable colorant to reproduce corresponding image data on the sheet. Therefore, it is possible to ensure good maintenance of data based on which an image is formed while enabling the reuse of a sheet.

Although the present embodiment was described such that image formation is performed in the rewritable print mode when an image forming job is designated to be performed in the rewritable print mode, image formation may be performed in the rewritable print mode similarly when an image is formed based on a received FAX document or copying a document. In this case, a user may input settings so that an image of a FAX document and a copied document will be formed in the rewritable print mode through an operation input on the operation input unit 16 or the like.

Moreover, although the present embodiment was described such that the decolored image is formed on a sheet (paper) again, the invention is not limited to this. If it is only necessary to view the decolored image, a process of identifying the decolored image by reading the identification information image of the sheet having the decolored image and displaying the decolored image on the display panel 14 of the MFP 1 or other display devices such as a display of the client terminal 160 on the network 150 may be performed.

Furthermore, although the present embodiment was described such that the decolored image is formed on the same sheet again on which the image was originally formed with a decolorable colorant, the invention is not limited to this, but the decolored image may be identified and formed on a different sheet. Moreover, when the decolored image is formed on the sheet having the decolored image or a different sheet, it is not always necessary to form the decolored image with a decolorable colorant but the decolored image may be formed with a non-decolorable colorant.

Furthermore, although the present embodiment was described such that the decolorable colorant is decolored with heat, the invention is not limited to this, the decolorable colorant may be a colorant that is decolored with light energy and may be a colorant that is decolored by reacting with other materials.

Furthermore, although the present embodiment was described such that the MFP 1 has an entirety of the image forming function in the rewritable print mode and an entirety of the image forming function in the reproduction mode, the invention is not limited to this, but an external device such as the terminal 160 may have a part of the function. In this case, a program corresponding to the function realized in the terminal 160 may be stored in the memory 160b or the like so that the function of the terminal 160 is realized when the processor 160a executes the program.

Furthermore, although the present embodiment was described such that the identification information image corresponding to the identification information identifying a sheet is formed on the sheet, the invention is not limited to this, but an identification information image correlated to an image formed with a decolorable colorant may be formed on the sheet. That is, an MFP serving as an image forming apparatus may be configured to include an image data acquiring unit that acquires image data of an image formed on a sheet, an identification information acquiring unit that acquires identification information that identifies the image formed on the sheet, and an image forming unit that forms an image based on the image data acquired by the image data acquiring unit on the sheet with a decolorable colorant which becomes colorless by a predetermined chemical reaction and that forms an identification information image based on the identification information that is acquired by the identification information acquiring unit and that corresponds to the image on the sheet with a non-decolorable colorant which does not become colorless by the chemical reaction that makes the decolorable colorant colorless. According to such a configuration, the image data of the image formed with the decolorable colorant are stored in the image data DB 100 to be correlated to the identification information. When the image formed with the decolorable colorant is decolored, and it is desired to reproduce that image on the sheet, the image reading sensor 24 or the like reads the identification information image formed on the sheet, and the image data acquiring unit 504 references the image data DB 100 to acquire the image data correlated to the read identification information. Therefore, by forming an image on the sheet based on the acquired image data, it is possible to reproduce the decolored image on the sheet. As described above, by storing the identification information to be correlated to the image data, it is possible to reproduce the decolored image.

Figure 8:
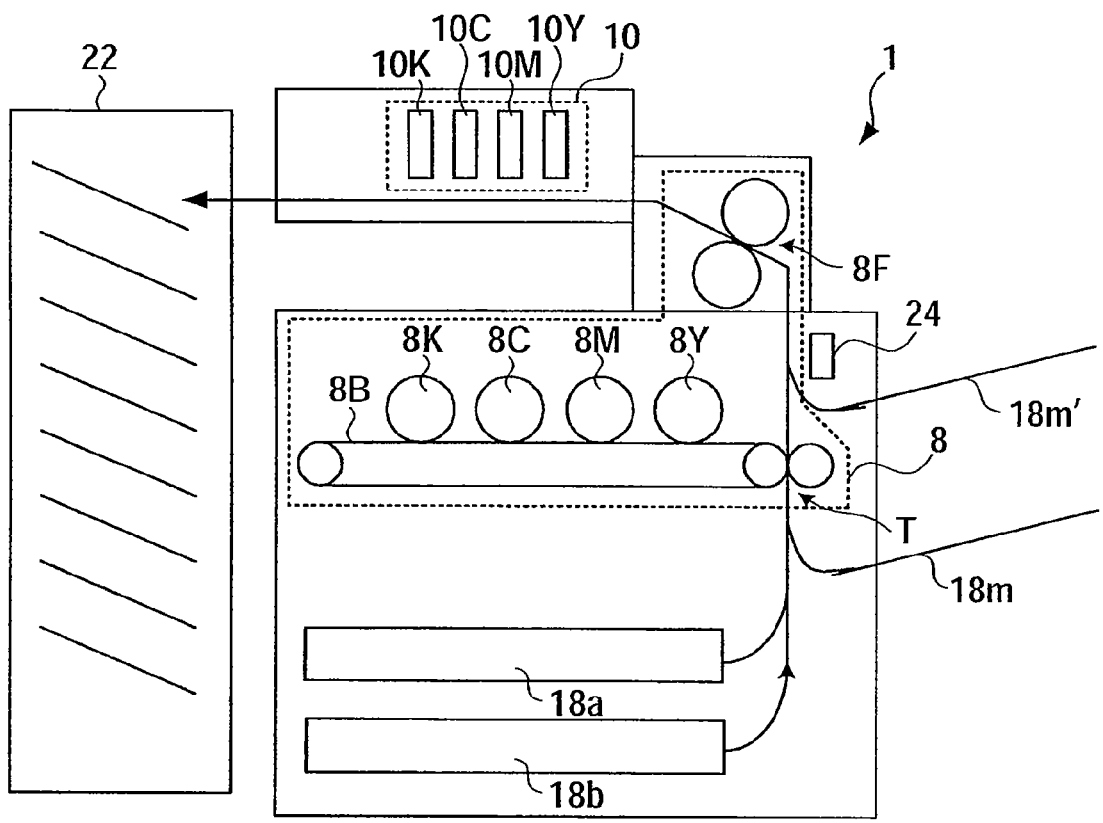
FIG. 8 is a configuration diagram showing a modification of the MFP according to the first embodiment.

Furthermore, although the present embodiment was described such that sheets are supplied from the manual supply unit 18*m* during image formation in the reproduction mode, the invention is not limited to this, but for example, as shown in FIG. 8, a dedicated manual supply unit 18*m*' for use during image formation in the reproduction mode may be provided to the MFP 1 so that sheets are supplied from the dedicated manual supply unit 18*m*'.

Figure 9:
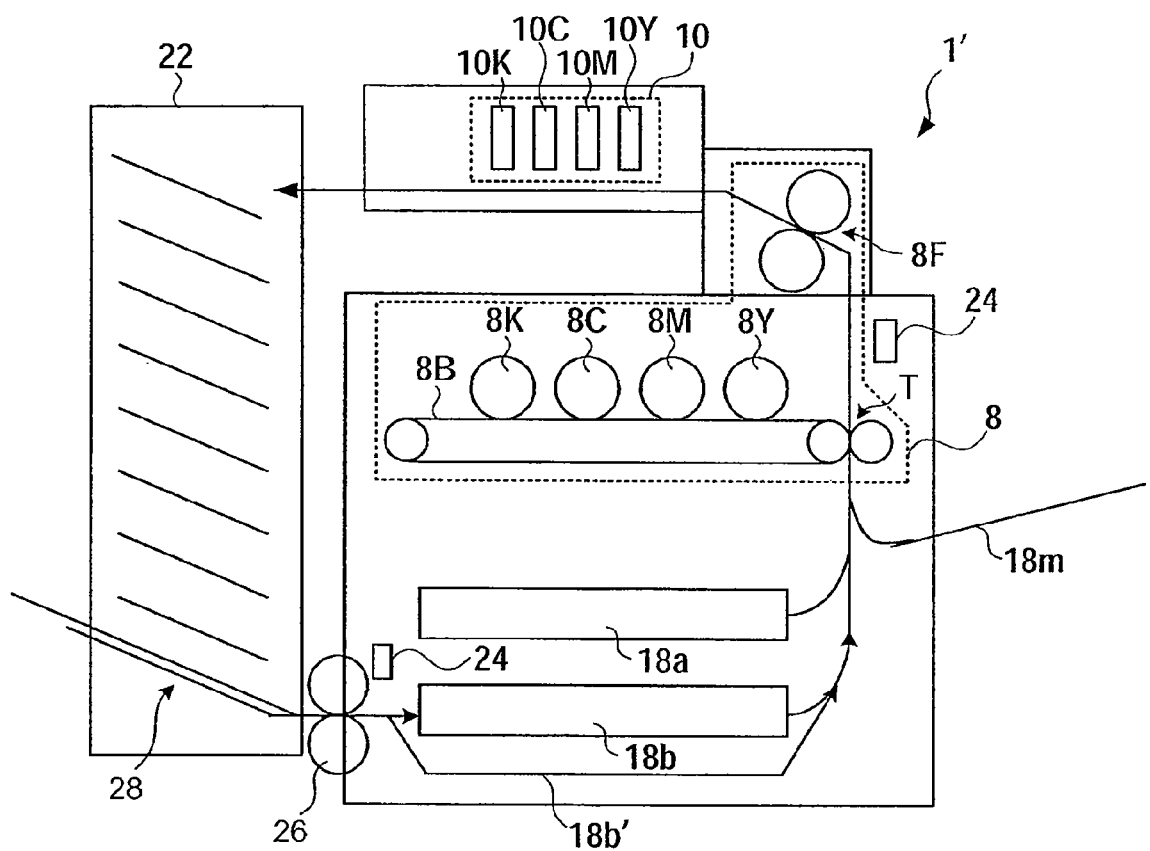
FIG. 9 is a configuration diagram showing another modification of the MFP according to the first embodiment.

In addition, as another modification, as shown in FIG. 9, an MFP 1' may be configured to include a decoloring device 26 that is disposed to be close to the reused sheet supply unit 18*b* so as to decolor an image on a sheet formed with a decolorable colorant, an image reading sensor 24' that is disposed between the decoloring device 26 and the reused sheet supply unit 18*b* so as to read an identification information image, and an image formed sheet supply unit 28 that is disposed below the finisher device 22 so as to store sheets on which images are formed with a decolorable colorant, and that has a function of sequentially supplying the sheets to the decoloring device 26.

The decoloring device 26 is a device that decolors images formed on a sheet with a decolorable colorant by heating the sheet to a temperature equal to or higher than a temperature at which the decolorable colorant becomes colorless.

According to such a configuration, when image formation is performed in the rewritable print mode, a sheet is supplied from the image formed sheet supply unit 28 to the decoloring device 26 and is subjected to a decoloring process. The sheet is then stored in the reused sheet supply unit 18*b* as a reused sheet having a decolored image and is used for image formation in the rewritable print mode. An image forming process in the rewritable print mode is the same as that described in the first embodiment. On the other hand, when image formation is performed in the reproduction mode, the image reading sensor 24' reads an identification information image formed on a sheet, which was subjected to the decoloring process by the decoloring device 26, with a non-decolorable colorant, and the sheet is transported to the second image forming unit 10 via the sheet supply unit 18*b*' for the reproduction mode. Then, the above-described image data acquiring unit 504 acquires the image data corresponding to the identification information read by the image reading sensor 24' from the image data DB 100, and an image is formed based on the image data by the second image forming unit 10. In the modification of the first embodiment, it is possible to reproduce reliably an image that was decolored.

Second Embodiment

Figure 10:
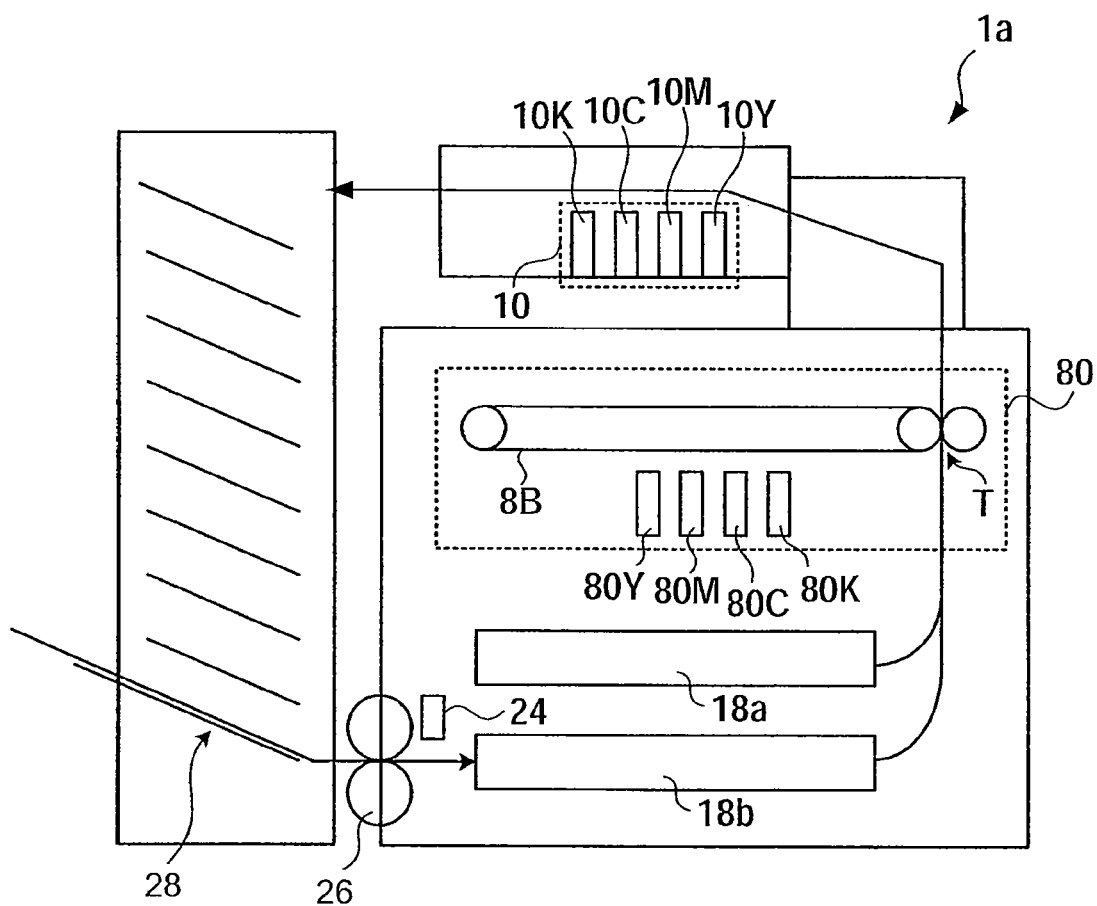
FIG. 10 is a diagram showing the configuration of an MFP according to a second embodiment.

Next, a second embodiment will be described. An MFP 1*a* of the present embodiment is configured to perform both image formation with a non-decolorable colorant and image formation with a decolorable colorant by an ink jet method. FIG. 10 is a diagram showing the configuration of the MFP 1*a* according to the present embodiment. The MFP 1*a* of the present embodiment includes a first image forming unit 80 of an ink jet method instead of the first image forming unit 8 of the first embodiment. The second image forming unit 10 is an image forming unit of an ink jet method similar to the first embodiment. In the following, the MFP 1*a* of the present embodiment will be described, and the same configuration as the first embodiment will be denoted by the same reference numerals and description thereof will be omitted.

The first image forming unit 80 of the present embodiment includes print heads 80K, 80C, 80M, and 80Y that discharge a non-decoloring ink which is a non-decolorable colorant, the intermediate transfer belt 8B, and the like. The print heads 80K, 80C, 80M, and 80Y are configured to discharge ink of the colors black, cyan, magenta, and yellow, respectively. The print heads 80K to 80Y discharge a non-decoloring ink to the intermediate transfer belt 8B, and a non-decoloring ink image is formed on the intermediate transfer belt 8B. The non-decoloring ink image formed on the intermediate transfer belt 8B is transferred to a sheet at a transfer position T.

In the present embodiment, the first image forming unit 80 that performs image formation with a non-decoloring ink forms an identification information image corresponding to identification information on a sheet when image formation is performed in the rewritable print mode. In a normal image forming process other than the rewritable print mode, image formation is performed by a normal ink jet method using a non-decoloring ink.

Moreover, image formation in the reproduction mode is performed similarly to the case of the first embodiment. For example, the image reading sensor 24' reads an identification information image on a sheet supplied from the image formed sheet supply unit 28, and the second image forming unit 10 forms an image with a decoloring ink based on the image data corresponding to identified identification information.

The functional blocks of the MFP 1*a* of the present embodiment are the same as the functional blocks of the MFP 1 of the first embodiment shown in FIG. 3. Moreover, the details of the image forming method in the rewritable print mode and the image forming method in the reproduction mode by the MFP 1*a* of the present embodiment are the same as those of the processes shown in FIGS. 6 and 7 and described in the first embodiment, and description thereof will be omitted.

In the MFP 1*a* having such a configuration, similarly to the first embodiment, it is possible to form an identification information image that identifies a sheet with a non-decolorable colorant (non-decoloring ink) during image formation in the rewritable print mode. Moreover, it is possible to store the image data based on which an image is formed with a decolorable colorant (decoloring ink) and the sheet identification information to be correlated to each other. Therefore, it is possible to reproduce an image even when the image formed with a decolorable colorant is decolored and disappears.

Moreover, since the MFP 1*a* of the present embodiment has the first and second image forming units 80 and 10 which both use an ink jet method, it is possible to downsize the MFP 1a further than the MFP 1 of the first embodiment.

Although the present embodiment was described such that the print heads 80K to 80Y of the first image forming unit 80 are configured to form an ink image on the intermediate transfer belt and transfer the image to a sheet, the invention is not limited to such a configuration, but a configuration of a normal ink jet method may be used in which the print heads 80K to 80Y discharge ink directly to a sheet to form an image.

Figure 11:
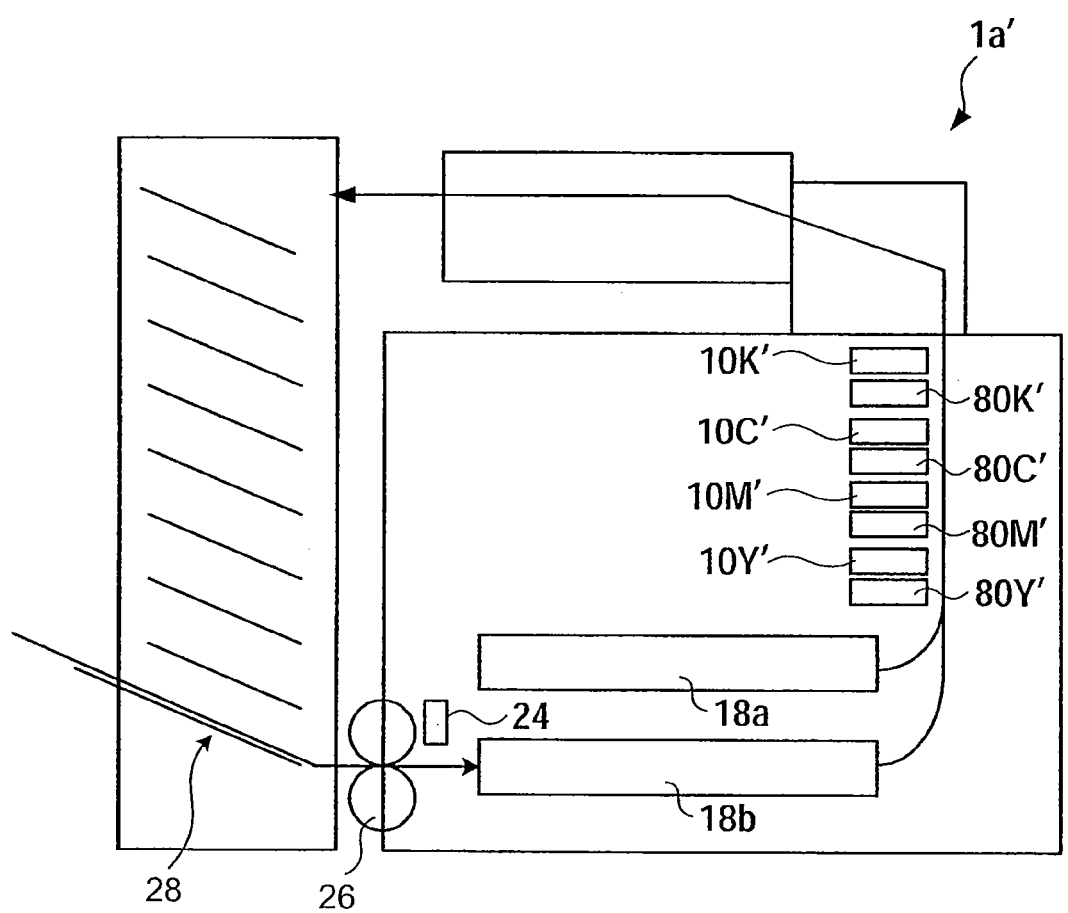
FIG. 11 is a configuration diagram showing a modification of the MFP according to the second embodiment.

As a modification of the MFP 1a of the second embodiment, an MFP 1a' shown in FIG. 11 is possible. FIG. 11 is a diagram showing the configuration of the MFP 1a' which is a modification of the MFP 1a of the second embodiment. The MFP 1a' has a configuration in which print heads 80K to 80Y discharging a non-decoloring ink which is a non-decolorable colorant and print heads 80K' to 80Y' discharging a decoloring ink which is a decolorable colorant are arranged at the same location, and image formation is performed by the print heads. In the rewritable print mode, an identification information image that identifies a sheet is formed with a non-decoloring ink discharged from the print heads 80K to 80Y, and an image is formed based on image data acquired as a print job with a decoloring ink discharged from the print heads 80K' to 80Y'. Moreover, in the reproduction mode, a sensor such as the image reading sensor 24' reads the identification information image formed on a sheet, on which a colorant of an image is decolored, and image data corresponding to identified identification information are formed on a sheet with a decoloring ink discharged from the print heads 80K' to 80Y'. The image may be reproduced with a non-decolorable colorant.

Third Embodiment

Next, a third embodiment will be described. An MFP 1b of the present embodiment is configured to perform both image formation with a non-decolorable colorant and image formation with a decolorable colorant by an electrophotographic method. In the following, the MFP 1b of the present embodiment will be described, and the same configuration as the above-described embodiments will be denoted by the same reference numerals and description thereof will be omitted.

Figure 12:
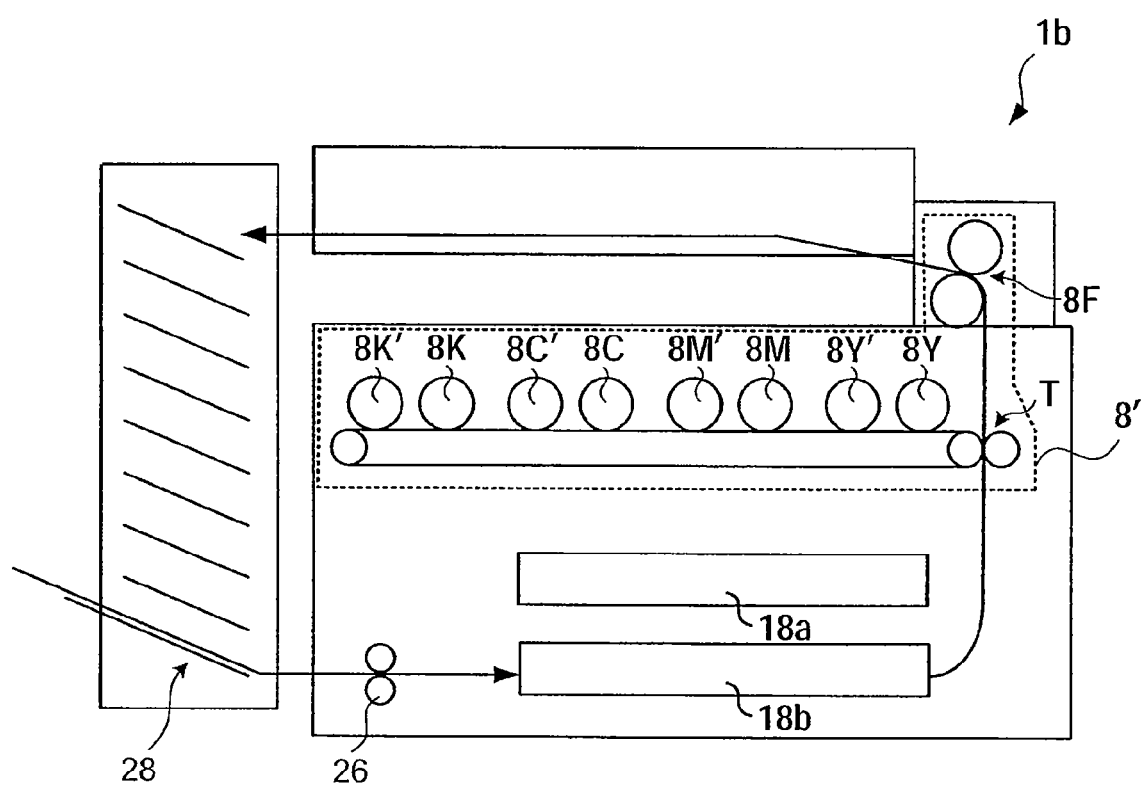
FIG. 12 is a diagram showing the configuration of an MFP according to a third embodiment.

FIG. 12 is a diagram showing the configuration of the MFP 1b according to the present embodiment. The MFP 1b of the present embodiment includes an image forming unit 8' that is made up of the photoconductive drums 8K to 8Y that use a non-decolorable colorant and constitute the first image forming unit 8 of the first embodiment and photoconductive drums 8K', 8C', 8M', and 8Y' that are disposed to be adjacent to each of the photosensitive drums 8K to 8Y so as to form a developer image with a decolorable colorant. The photoconductive drums 8K', 8C', 8M', and 8Y' of the image forming unit 8' are configured to form a developer image with decolorable colorants of the colors black, cyan, magenta, and yellow, respectively.

Therefore, in the MFP 1b of the present embodiment, when image formation is performed in the rewritable print mode, image data acquired as an image forming job are formed with a developer image formed by the photoconductive drums 8K' to 8Y' that use a decolorable colorant, and an identification information image is formed with a developer image formed by the photoconductive drums 8K to 8Y that use a non-decolorable colorant. That is to say, a developer image is formed on the photoconductive drums 8K' to 8Y' with a decolorable colorant based on the image data acquired as the print job, and a developer image is formed on the photoconductive drums 8K to 8Y with a non-decolorable colorant based on the identification information image. The developer image formed with the non-decolorable colorant and the developer image formed with the decolorable colorant are transferred (primarily transferred) from the respective photoconductive drums 8K to 8Y and 8K' to 8Y' to the intermediate transfer belt 8B. In this way, an image that is formed with the decolorable colorant and acquired as a print job and the developer image that is made up of the identification information image formed with the non-decolorable colorant are formed on the intermediate transfer belt 8B. The developer image is transferred (so-called secondarily transferred) to a sheet at a transfer position T, and the developer image on the sheet is thermally fixed to the sheet by the fixing device 8F. As described above, the MFP 1b of the present embodiment is able to form the image formed with the decolorable colorant and the identification information image formed with the non-decolorable colorant at the same time through one process involving transferring and heat-fixing of a developer image to the sheet.

Moreover, in the MFP 1b of the present embodiment, when image formation is performed in the reproduction mode, for example, similarly to the case of the first embodiment, the image reading sensor 24' reads an identification information image on a sheet supplied from the image formed sheet supply unit 28, and image formation is performed with a decoloring ink based on image data corresponding to identification information that is identified from the read identification information image.

The functional blocks of the MFP 1b of the present embodiment are the same as the functional blocks of the MFP 1 of the first embodiment shown in FIG. 3. However, the first image forming unit control unit 112 controls the photoconductive drums 8K to 8Y corresponding to the first image forming unit to perform image formation with a non-decolorable colorant, and the second image forming unit control unit 114 controls the photoconductive drums 8K' to 8Y' corresponding to the second image forming unit 10 to perform image formation with a decolorable colorant. Moreover, other function such as the intermediate transfer belt 8B and the fixing device 8F may be controlled either by the first image forming unit control unit 112 or the second image forming unit control unit 114.

Moreover, the details of the image forming method in the rewritable print mode and the reproduction mode according to the present embodiment are the same as those of the processes shown in FIGS. 6 and 7 and described in the first embodiment, and description thereof will be omitted.

According to the above-described MFP 1b of the present embodiment, similarly to the first and second embodiments, it is possible to form an identification information image that identifies a sheet with a non-decolorable colorant (non-decoloring ink) during image formation in the rewritable print mode. Moreover, it is possible to store the image data formed with a decolorable colorant (decoloring ink) and the sheet identification information to be correlated to each other. Therefore, it is possible to reproduce an image even when the image formed with a decolorable colorant is decolored and disappears.

Fourth Embodiment

Next, a fourth embodiment will be described. An MFP 1c according to the present embodiment causes the image reading unit 12 to read an identification information image on a sheet, on which an image is decolored, during image formation in the reproduction mode. Thus, the MFP 1c is able to reproduce the image on a sheet different from the original sheet, from which the identification information image was read, by acquiring image data corresponding to identification information that is identified from the identification information image and forming an image based on the acquired image data on the sheet. Therefore, the MFP 1c has the same configuration as the MFP shown in FIG. 1. Thus, the image formation in the reproduction mode according to the present embodiment, namely the process wherein the image reading unit 12 reads the identification information image, and an image that was decolored is reproduced by forming the image on a sheet different from the original sheet from which the identification information image was read can be applied to any of the MFPs shown in FIGS. 2, 9, 10, 11, and 12.

Figure 13:
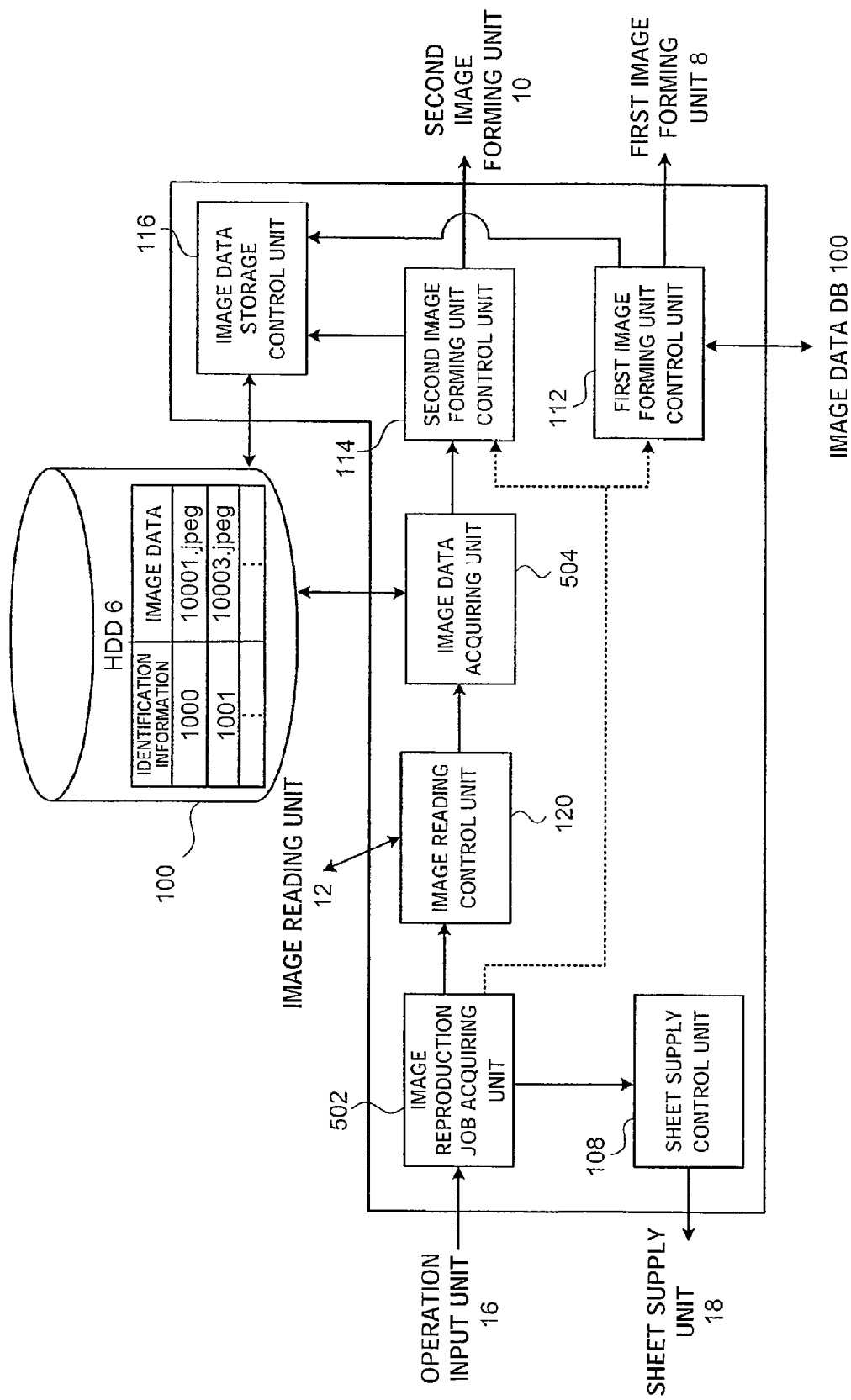
FIG. 13 is a functional block diagram showing functional blocks in the reproduction mode of an MFP according to a fourth embodiment.

Next, the functional blocks for realizing the process in the reproduction mode by the MFP 1c of the present embodiment will be described. FIG. 13 is a functional block diagram showing the function in the reproduction mode of the MFP 1c according to the present embodiment.

As functional blocks different from the functional blocks shown in FIG. 5, the MFP 1c includes an image reading control unit 120, an image data storage control unit 116, and a first image forming unit control unit 112. The other functional blocks such as the image reproduction job acquiring unit 502, the sheet supply control unit 108, the image data acquiring unit 504, and the second image forming unit control unit 114 are the same as those of the first embodiment. However, when an image to be reproduced is formed by the first image forming unit 8 rather than by the second image forming unit 10, the first image forming unit control unit 10 may control the first image forming unit 8 to perform image formation.

When the image reproduction job acquiring unit 502 acquires an image reproduction job instructing to execute image formation in the reproduction mode through an operation input on the operation input unit 16 or the like, the image reading control unit 120 causes the image reading unit 12 to scan a sheet on which an image was decolored, and which is placed on a document table or the like of the image reading unit 12 and read an identification information image formed on the sheet with a non-decolorable colorant. Then, based on the identification information identified from the identification information image, the image data acquiring unit 504 references the image data DB 100 of the HDD 6 to acquire corresponding image data. In this way, it is possible to reproduce the decolored image by forming an image based on the image data on a sheet transported to the image forming unit. At that time, as described above, in the present embodiment, image formation is performed on a sheet different from the sheet on which the decolored image was formed. Specifically, the sheet supply control unit 108 may control the sheet supply unit 18 to transport a reused sheet from the reused sheet supply unit 18b so that the image forming unit performs image formation on the reused sheet. Alternatively, the sheet supply control unit 108 may control the sheet supply unit 18 to transport an unused sheet from the sheet supply unit 18a storing unused sheets so that image formation is performed on the unused sheet.

The image data storage control unit 116 is the same function as the first embodiment. In the present embodiment, when the second image forming unit 10 forms an image to be reproduced as an image formed with a decolorable colorant (alternatively, when the photoconductive drums 8K' to 8Y' using a decolorable colorant shown in FIG. 12 form a developer image of an image to be reproduced), the image data storage control unit 116 executes a process of registering the image data formed on the sheet and the sheet identification information to the image data base of the HDD 6 in a correlated manner. By doing so, even when an image disappears again due to decoloring, it is possible to reproduce the image from the different sheet, on which the image is reproduced, by any of the above-described reproducing methods.

Moreover, if an image reproduction job contains an instruction to form an image to be reproduced on an unused sheet, when the image reproduction job acquiring unit 502 acquires the image reproduction job, the first image forming unit control unit 112 generates new identification information assigned to the sheet and causes the first image forming unit 8 to form an identification information image corresponding to the identification information with a non-decolorable colorant. When new identification information is generated, the image data storage control unit 116 stores the identification information and the reproduced image data in the image data DB 100 in a correlated manner. In FIG. 13, the flow of signals when the image reproduction job contains an instruction to form an image to be reproduced on an unused sheet is denoted by the dotted line.

Figure 14:
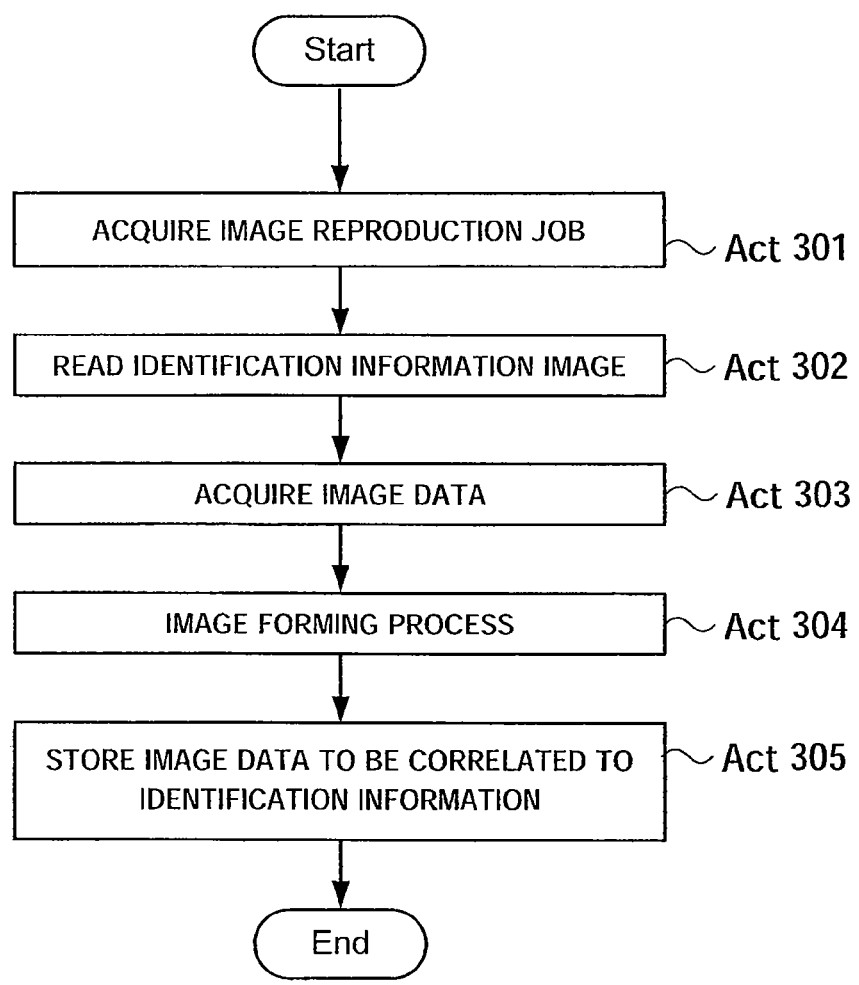
FIG. 14 is a flowchart showing the flow of an image forming process in the reproduction mode of the MFP according to the fourth embodiment.

Next, the flow of processing in the MFP 1c of the present embodiment when image formation is performed in the reproduction mode will be described. FIG. 14 is a flowchart showing the flow of an image forming process in the reproduction mode by the MFP 1c.

First, in Act 301, a user places a sheet on which a decolored image is formed on the image reading unit 12 and operates the operation input unit 16 to issue an instruction to execute an image forming process in the reproduction mode. In Act 301, the image reproduction job acquiring unit 502 acquires an image reproduction job.

Subsequently, in Act 302, the image reading control unit 120 causes the image reading unit 12 to execute a process of reading an identification information image formed in a predetermined region of a sheet placed on the image reading unit 12.

Subsequently, in Act 303, the image data acquiring unit 504 references the image data DB 100 based on identification information that is identified from the identification information image read by the image reading unit 12 to acquire image data whose registration time is the latest among the image data correlated to the identification information.

Subsequently, in Act 304, the second image forming unit control unit 114 executes a process of causing the second image forming unit 10 to form the image data acquired in Act 303 on a sheet.

Subsequently, in Act 305, the image data storage control unit 116 executes a process of registering the image data formed for reproduction on the sheet by the second image forming unit 10 and the identification information assigned to the sheet, on which an image is formed based on the image data, to the image data DB 100 in a correlated manner.

In Act 304, when the sheet to be printed is a reused sheet, the image reading sensor 24 shown in FIG. 2 or the like, or if the MFP includes the image formed sheet supply unit 28 and the image reading sensor 24' as shown in FIG. 9 or the like, the image reading sensor 24' reads the identification information image that is formed on the reused sheet transported for forming, and the identification information is stored in the image data DB 100 to be correlated to the image data based on which the image is formed in Act 304.

On the other hand, when the sheet on which an image to be reproduced will be formed is an unused sheet supplied from the sheet supply unit 18a, as described above, the first image forming unit control unit 112 generates new identification information that is not registered by referencing the image data DB 100 and causes the first image forming unit 8 to form an identification information image corresponding to the identification information. Moreover, the image data storage control unit 116 stores the reproduced image data and the newly assigned identification information in the image data DB 100 in a correlated manner.

The image forming process in the reproduction mode by the MFP 1*c* according to the present embodiment was described hereinabove.

According to the present embodiment, it is possible to form an image to be reproduced on a sheet different from an original sheet having a decolored image. Moreover, since an identification information image is read by the image reading unit 12 that is provided to a general MFP, it is possible to reproduce an image on a sheet without a dedicated image reading sensor such as the image reading sensor 24.

Fifth Embodiment

Next, a fifth embodiment will be described. Although the MFPs of the above-described embodiments are configured to store the image data DB 100 in the HDD 6, an MFP 1*d* of the present embodiment is configured differently in that the image data DB 100 is stored in an external server 500 connected via the network 150.

Figure 15:
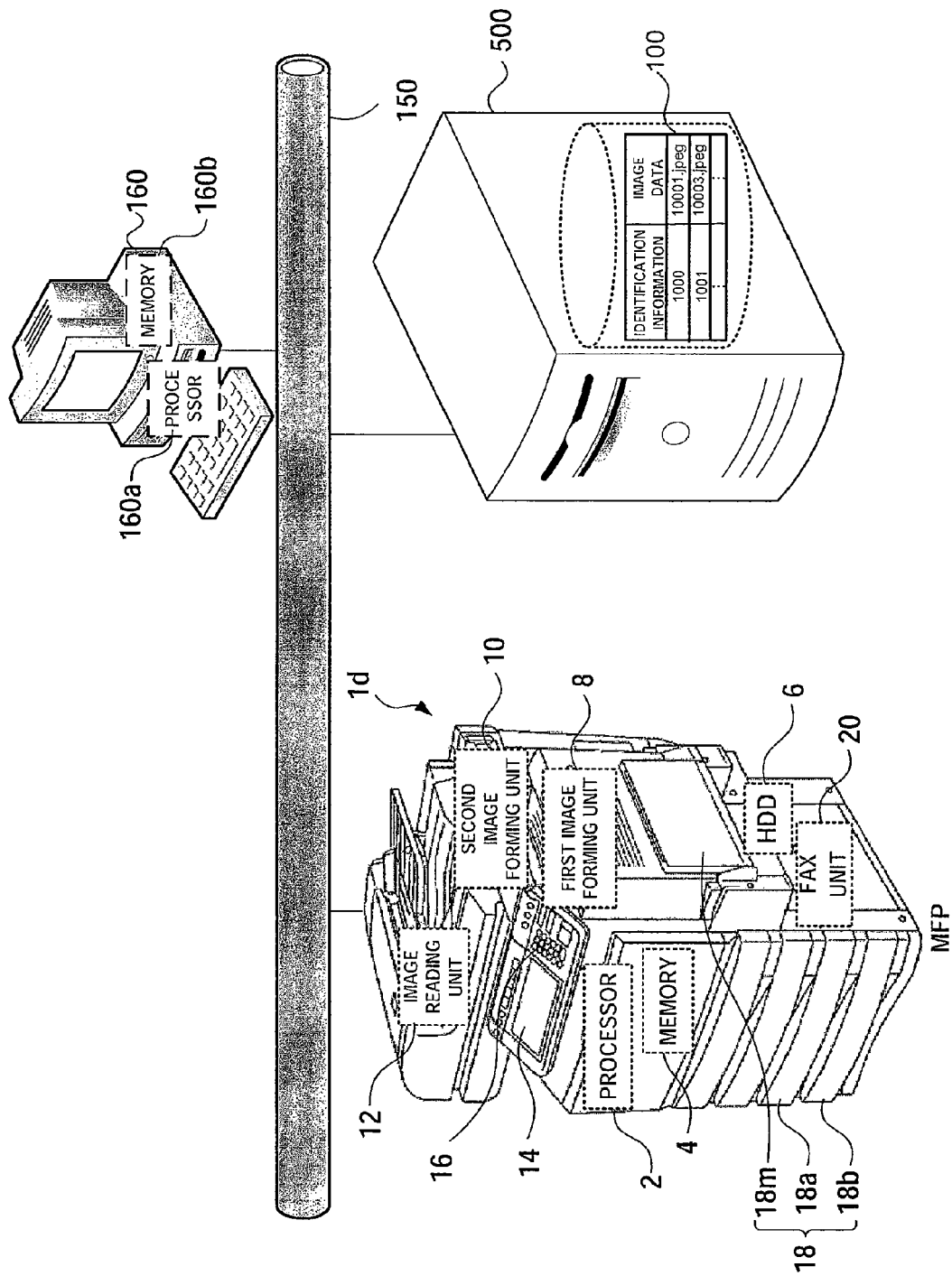
FIG. 15 is a diagram showing the configuration of an MFP according to a fifth embodiment and the configuration of a system including a server in which an image data DB is stored.

FIG. 15 is a diagram showing the configuration of the MFP 1*d* according to the present embodiment and a system including the server 500 in which the image data DB 100 is stored.

The MFP 1*d* may have the same configuration as the MFP of the other embodiments described above, except that the image data DB 100 is not stored in the HDD 6. Moreover, the functional blocks of the MFP 1*d* are the same as the functional blocks shown in FIGS. 3 and 5, and description thereof will be omitted.

The server 500 stores the image data DB 100 in which image data base on which the image is formed by the MFP 1*d* and identification information for identifying an image formed sheet are stored in a correlated manner.

In a system including the MFP 1*d* and the server 500 having such a configuration, when the MFP 1*d* performs image formation in the rewritable print mode, the MFP 1*d* accesses the server 500 via the network 150 and stores a formed image and identification information in the image data DB 100 stored in the server 500 in a correlated manner. Moreover, even when new identification information is generated, the first image forming unit control unit 112 of the MFP 1*d* accesses the image data DB 100 of the server 500 and generates identification information that is not been registered. Moreover, when image formation is performed in the reproduction mode, the MFP 1*d* reads an identification information image on a sheet on which an image to be reproduced is formed, acquires corresponding image data from the image data DB 100 of the server 500 based on identification information identified from the identification information image, and reproduces the image on a sheet. As described above, even when the image data DB 100 is stored outside the MFP, similarly to the above-described embodiments, it is possible to perform the image forming process in the rewritable print mode and the reproduction mode. The details of the image forming process in the rewritable print mode and the reproduction mode are the same as those of the above-described embodiments, and description thereof will be omitted.

Sixth Embodiment

Figure 16:
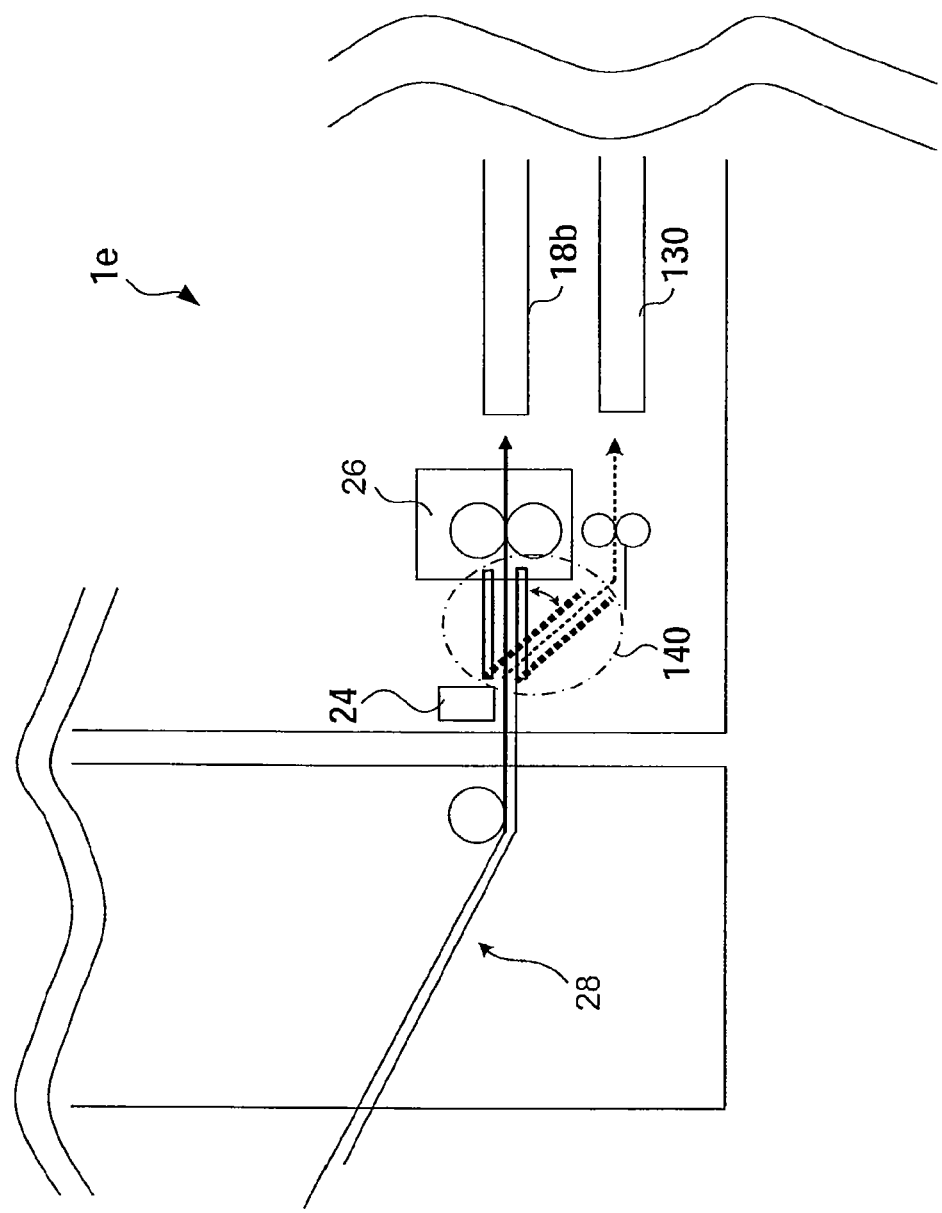
FIG. 16 is an enlarged view of the vicinity of a sheet supply unit of an MFP according to a sixth embodiment.

Next, a sixth embodiment will be described. FIG. 16 is an enlarged view of the vicinity of the sheet supply unit 18 of an MFP 1*e* according to the present embodiment.

Like the MFP 1' shown in FIG. 9 and described as the modification of the first embodiment, the MFP 1*e* of the present embodiment includes the following units at positions adjacent to the reused sheet supply unit 18*b* (first sheet storage unit): the image formed sheet supply unit 28, the image reading sensor 24' that reads an identification information image formed on a sheet, the decoloring device 26 that is disposed downstream of the image reading sensor 24' and upstream of the reused sheet supply unit 18*b* and the like. The MFP 1*e* further includes a disused sheet storage unit 130 (second sheet storage unit) that is disposed downstream of a transport path different from a transport path to the reused sheet supply unit 18*b* so as to store sheets that are not reused. Thus, the MFP 1*e* of the present embodiment includes a transport path switching unit 140 serving as a sheet sorting unit that selectively supplies a sheet transported from the image formed sheet supply unit 28 to the transport path to the reused sheet supply unit 18*b* being connected to the decoloring device 26 or to the transport path to the disused sheet storage unit 130 based on whether an identification information image is read by the image reading sensor 24'.

The transport path switching unit 140 is formed, for example, by a pair of plates facing in the vertical direction and is switched between a position wherein a sheet is transported towards the reused sheet supply unit 18*b* and a position wherein a sheet is transported towards the disused sheet storage unit 130. In this way, sheets are transported to either the reused sheet supply unit 18*b* or the disused sheet storage unit 130. The transport path switching unit 140 is not limited to the pair of illustrated plates, but may have any configuration as long as it is capable of selectively switching a transport destination to either of the reused sheet supply unit 18*b* and the disused sheet storage unit 130. For example, a flap-like transport path switching unit 140 is also possible.

According to the described configuration, when a sheet stored in the image formed sheet supply unit 28 is transported, the image reading sensor 24' disposed upstream of the transport path switching unit 140 reads an identification information image on the sheet. If the identification information image was read properly as a result of the reading, it can be determined that an image is formed on the sheet with a decolorable colorant, and it is therefore possible to decolor an image on the sheet by a decoloring process and obtain a sheet like a blank paper. Therefore, in this case, the transport path switching unit 140 performs switching so that the sheet is transported to the reused sheet supply unit 18*b* via the decoloring device 26. Thereafter, the decoloring device 26 decolors the sheet by a decoloring process such as heating, and the decolored sheet is stored in the reused sheet supply unit 18*b* in a reusable state like a blank paper. The sheets stored in the reused sheet supply unit 18*b* are reused for forming in the rewritable print mode and the reproduction mode.

On the other hand, when the identification information image was not read by the image reading sensor 24', it can be determined that an image is not formed on the sheet with a decolorable colorant and cannot be decolored. Thus, the transport path switching unit 140 performs switching so that the sheet is transported to the disused sheet storage unit 130.

Therefore, according to the MFP 1*e* of the present embodiment, it is possible to read an identification information image formed on a sheet with a non-decolorable colorant, perform a decoloring process on a reusable sheet to obtain a sheet like a blank sheet that can be reused, and store the decolored sheet in the reused sheet supply unit 18*b*. Moreover, it is possible to transport a sheet that can be neither decolored nor reused to the disused sheet storage unit 130. Therefore, it is possible to sort sheets into reusable sheets and non-reusable sheets and use only the reusable sheets for image formation without requiring a user's determination with the naked eye as to whether or not an image formed on a sheet is formed with a decolorable colorant. Moreover, even when the user tries to discriminate between the sheets, it is difficult to differentiate an image formed with a decolorable colorant from an image formed with a non-decolorable colorant and reliably sort the sheets into reusable sheets and sheets to be disused.

Figure 17:
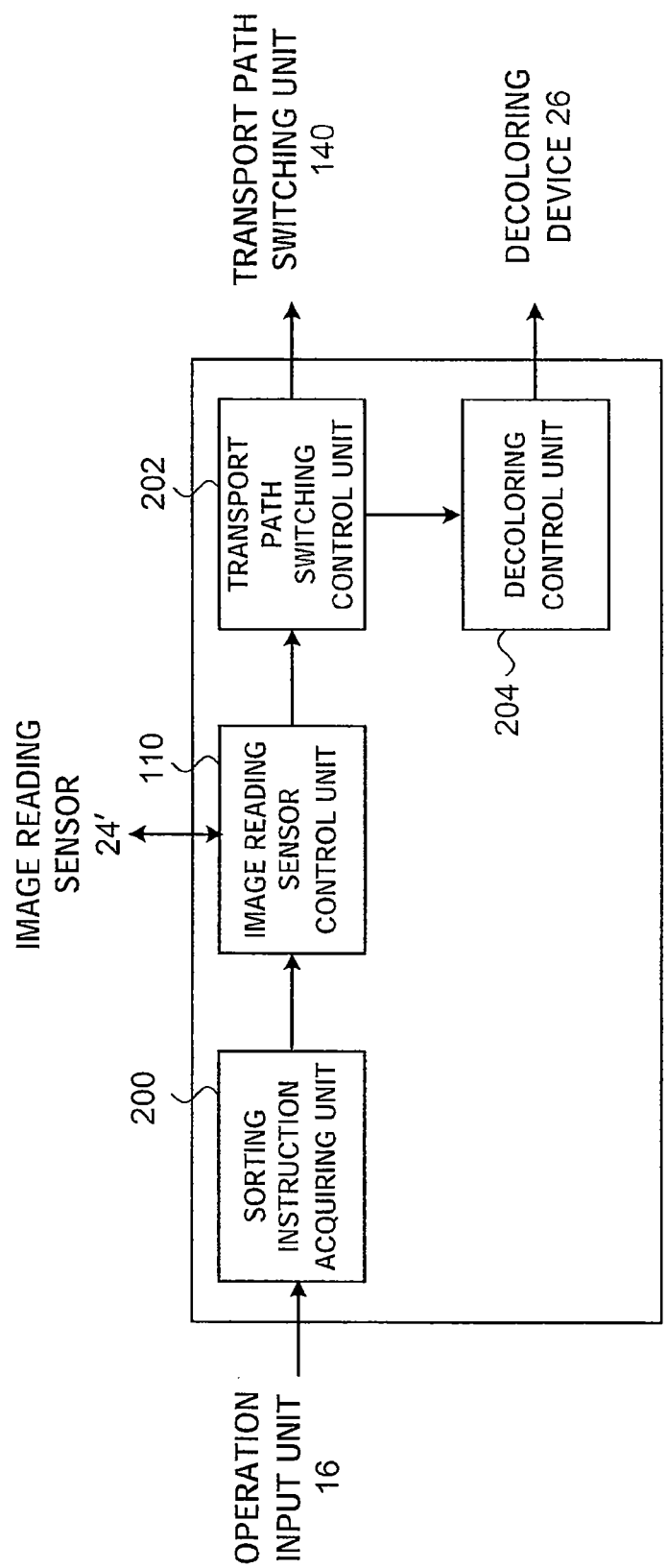
FIG. 17 is a functional block diagram of the MFP according to the sixth embodiment.

Next, functional blocks for realizing the sorting process by the above-described transport path switching unit 140 of the present embodiment will be described. FIG. 17 is a functional block diagram of the MFP 1e according to the present embodiment.

The MFP 1e includes a sorting instruction acquiring unit 200, the image reading sensor control unit 110, a transport path switching control unit 202 serving as a sorting control unit, and a decoloring control unit 204.

The sorting instruction acquiring unit 200 acquires a sorting instruction when a user places sheets that the user wants to reuse by decoloring images formed on the sheets on the image formed sheet supply unit 28 and issues an instruction through an operation input on the operation input unit 16 to execute a process of performing a decoloring process on the placed sheets and sorting the sheets into sheets to be reused and sheets to be disused.

When the sorting instruction acquiring unit 200 acquires the sorting instruction, the image reading sensor control unit 110 executes a process of causing the image reading sensor 24' to read an identification information image formed on a sheet that is transported from the image formed sheet supply unit 28 by transport rollers or the like.

The transport path switching control unit 202 determines whether or not the image reading sensor 24' acquired the identification information image under the control of the image reading sensor control unit 110. Then, the transport path switching control unit 202 changes the switching direction of the transport path switching unit 140 based on the determination results so that sheets subjected to the reading process are transported to the reused sheet supply unit 18b or the disused sheet storage unit 130.

The decoloring control unit 204 controls the decoloring device 26 to execute a decoloring process on a transported sheet when it is determined that an image is formed on the sheet with a decolorable colorant and a decoloring process can be performed based on the determination results by the transport path switching control unit 202 as to whether or not the image reading sensor 24' was able to read the identification information image, and when the sheet is transported to the reused sheet supply unit 18b.

The functional blocks for realizing the sheet sorting process using the identification information image and the decoloring process by the MFP 1e according to the present embodiment was described hereinabove.

Figure 18:
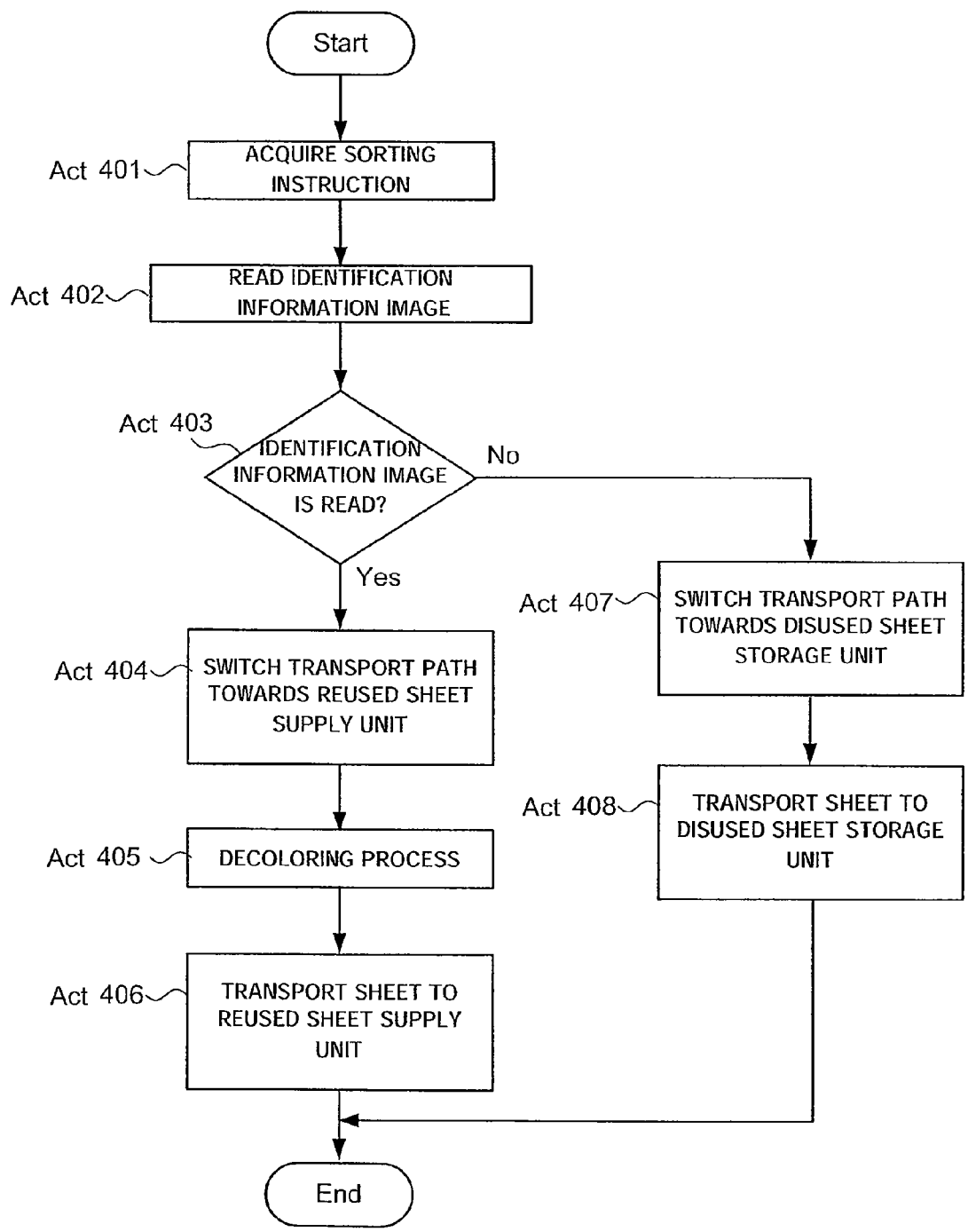
FIG. 18 is a flowchart showing the flow of a sheet sorting process by the MFP according to the sixth embodiment.

Next, the flow of the sheet sorting process by the MFP 1e of the present embodiment will be described. FIG. 18 is a flowchart showing the flow of the sheet sorting process by the MFP 1e.

First, in Act 401, the sorting instruction acquiring unit 200 acquires an instruction from the operation input unit 16 to execute a process of sorting image formed sheets stored in the image formed sheet supply unit 28.

Subsequently, in Act 402, when the sorting instruction acquiring unit 200 acquired the sorting instruction, the image reading sensor control unit 110 causes the image reading sensor 24' to execute a process of reading an identification information image among images that are formed on a sheet transported from the image formed sheet supply unit 28. In Act 403, the transport path switching unit 202 determines whether or not the identification information image was read by the image reading sensor 24'.

When it was determined that the identification information image was read (Act 403: Yes), the transport path switching control unit 202 determines that images are formed on the sheet with a decolorable colorant and executes a process of changing the switching direction of the transport path switching unit 140 so that the sheet is transported to the reused sheet supply unit 18b.

Subsequently, in Act 405, the decoloring control unit 204 controls the decoloring device 26 to execute a process of decoloring images formed on the sheet transported towards the reused sheet supply unit 18b.

Subsequently, in Act 406, transport rollers or the like, which are not shown, transport the sheet on which images are decolored and which became a blank paper to the reused sheet supply unit 18b.

On the other hand, when it was determined that the identification information image was not read by the image reading sensor 24' (Act 403: No), the transport path switching control unit 202 determines in Act 403 that images are formed on the sheet with a non-decolorable colorant and executes in Act 407 a process of changing the switching direction of the transport path switching unit 140 so that the sheet is transported to the disused sheet storage unit 130.

Subsequently, in Act 408, transport rollers or the like, which are not shown, transport the sheet to be stored in the disused sheet storage unit 130.

The flow of the sheet sorting process by the MFP 1e of the present embodiment was described hereinabove.

As described above, according to the MFP 1e of the present embodiment, it is possible to sort the sheets simply into sheets to be reused and sheets to be disused by using the identification information image formed during the image forming process in the rewritable print mode.

Although the present embodiment was described such that a sheet is selectively reused or disused based on whether or not the identification information image was read, the invention is not limited to this. If the identification information image was read, the sheet may be selectively reused or disused based on a determination as to whether or not corresponding identification information is registered in the image data DB 100, and if registered, the identification information is stored to be correlated to image data. In this case, for example, an accurate sorting process is possible since it is even possible to sort, as a sheet to be disused, a sheet on which an image is formed with an identification information image but cannot be decolored because images are formed with a non-decolorable colorant.

Moreover, although the present embodiment was described such that the determination as to whether a sheet will be reused or disused is made based on whether or not the identification information image formed on the sheet was read, the invention is not limited to this. A simple image such as a mark or a character string capable of displaying the fact that an image formed on a sheet is formed with a decolorable colorant may be formed on a sheet with a non-decolorable colorant. For example, when image formation is performed in the rewritable print mode, a predetermined symbol displaying the fact that images are formed with a decolorable colorant may be formed at a predetermined position outside the region in which an image based on a print job is formed. In the sorting process described in the present embodiment, the predetermined position is read by the image reading sensor 24' or the like. In this case, when the predetermined symbol is read, it is determined that images are formed on the sheet with a decolorable colorant, and the sorting process is performed so that the sheet is transported to the reused sheet supply unit 18*b*.

Seventh Embodiment

Figure 19:
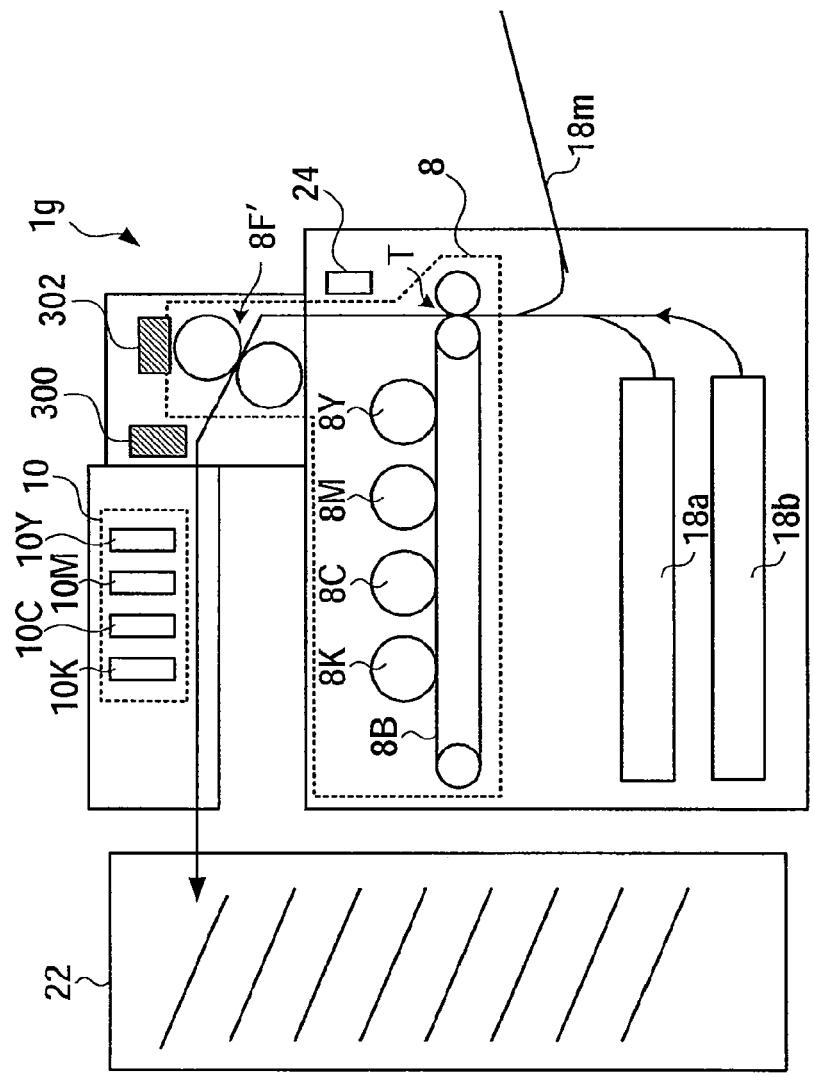
FIG. 19 is a diagram showing the configuration of an MFP according to a seventh embodiment.

Next, a seventh embodiment will be described. FIG. 19 is a diagram showing the configuration of an MFP 1*g* according to the present embodiment. The MFP 1*g* of the present embodiment is different from the MFP 1 of the first embodiment, in that the MFP 1*g* includes a fixing and decoloring device 8F' that has a function of decoloring images formed with a decolorable colorant in addition to a fixing function instead of the fixing device 8F described in the first embodiment. The MFP 1*g* of the present embodiment has a configuration that solves problems that arise if a fixing device also serves as a decoloring device. The other configurations are the same as those of the MFP 1 of the first embodiment, and description thereof will be omitted. That is, the MFP 1*g* has a configuration in which the first image forming unit 8 performs image formation with a non-decolorable colorant by an electrophotographic method, and the second image forming unit 10 performs image formation with a decolorable colorant by an ink jet method. The configuration of the MFP 1*g* according to the present embodiment will be described below.

First, the problems that arise when the fixing device also serves as the decoloring device will be described.

Figure 20:
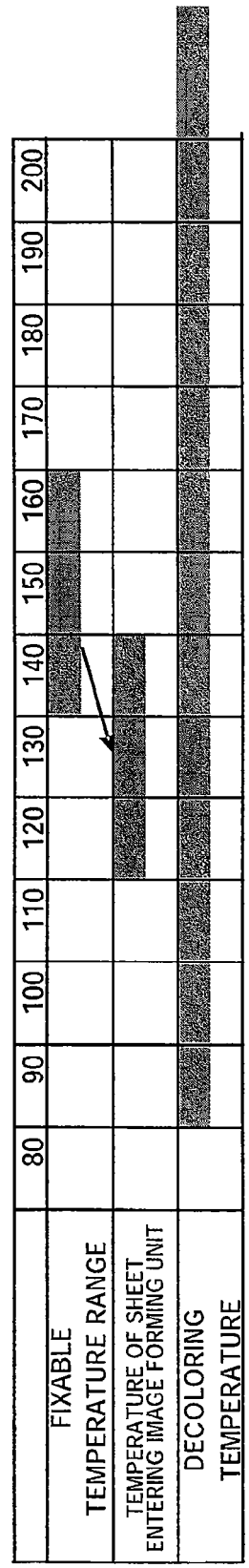
FIG. 20 is a diagram showing the relationship between a fixing temperature range and a decoloring temperature range.

A first problem is that if the decoloring temperature of a decolorable colorant is lower than the fixing temperature, when a sheet subjected to a fixing process at a temperature higher than the decoloring temperature is introduced into the second image forming unit 10 in the high-temperature state higher than the decoloring temperature, the decoloring ink which is the decolorable colorant of the second image forming unit 10 will be decolored by the heat of the sheet (see FIG. 20).

Figure 21:
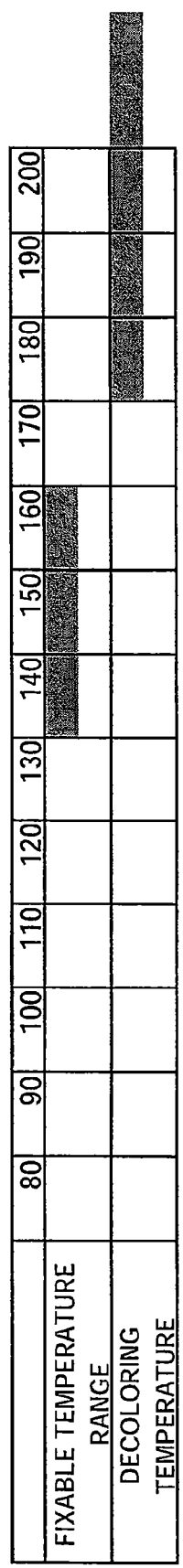
FIG. 21 is a diagram showing the relationship between a fixing temperature range and a decoloring temperature range.

A second problem is that if the fixing temperature is lower than the decoloring temperature, when a decoloring process is performed on a sheet at a temperature higher than the fixing temperature, and a subsequent sheet is subsequently subjected to forming with a non-decolorable colorant and a fixing process, so that the fixing and decoloring device maintains a temperature higher than the fixing temperature (see FIG. 21), a high-temperature offset will occur during heat-fixing of a developer image, thus leading to defective forming.

Figure 22:
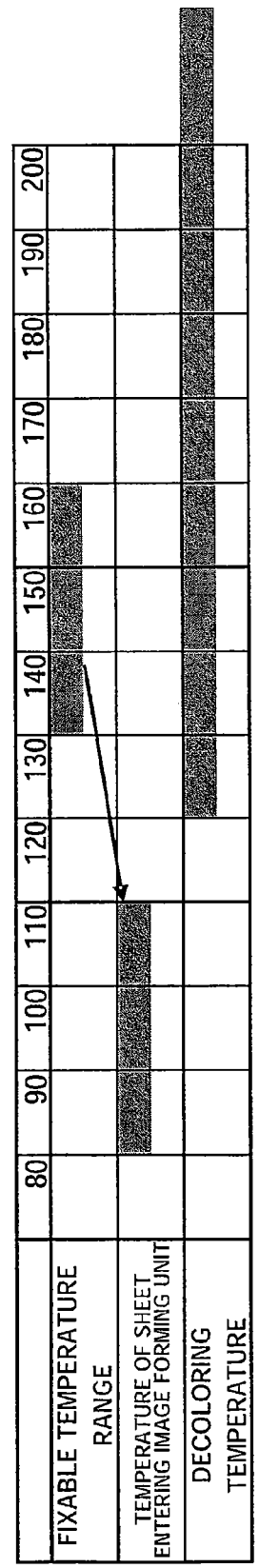
FIG. 22 is a diagram showing the relationship between a fixing temperature range and a decoloring temperature range.

To solve the first problem, as shown in FIG. 22, it is necessary to cool down the temperature of a sheet subjected to a fixing process by the fixing and decoloring device 8F' to a temperature (e.g., 90 to 110° C.) lower than the decoloring temperature (e.g., 130° C. or higher) and pass the sheet through the second image forming unit. If a sheet subjected to a decoloring process by the fixing and decoloring device 8F' was decolored at a temperature higher than the decoloring temperature, the sheet may be cooled down similarly because the temperature of the sheet will be higher than the decoloring temperature.

On the other hand, to solve the second problem, it is necessary to perform a decoloring process at a temperature higher than the fixing temperature, cool down the fixing and decoloring device 8F', and then perform image formation of a subsequent sheet.

As a means for solving the problems described above, first, in order to solve the first problem, the MFP 1*g* of the present embodiment may include a sheet cooling device 300 that is disposed between the fixing and decoloring device 8F' and the second image forming unit 10 so as to cool down a sheet subjected to a fixing process. As the sheet cooling device 300, for example, an air blowing device such as a fan that blows a cooling air to a sheet being transported or a cooling plate that comes into contact with a sheet to perform cooling may be used. Moreover, a transport path for cooling may be provided instead of the sheet cooling device 300. That is, it is possible to design a transport distance between the fixing and decoloring device 8F' and the second image forming unit 10 to be longer so that a sheet can be cooled down during transport.

Moreover, in order to solve the second problem, a fixing and decoloring device cooling device 302 that cools down the fixing and decoloring device 8F' may be provided. As the fixing and decoloring device cooling device 302, an air blowing device such as a fan that blows a cooling air to the fixing and decoloring device 8F' may be used, and a Peltier device may be provided to the fixing and decoloring device 8F' to perform temperature control.

The MFP 1*g* of the present embodiment is an MFP that includes two image forming units: a first image forming unit that performs image formation with a non-decolorable colorant by an electrophotographic method; and a second image forming unit that performs image formation with a decolorable colorant by an ink jet method. According to the MFP 1*g*, for example, even when a sheet formed with a non-decolorable colorant by an electrophotographic method is heated by a fixing process to a temperature higher than the decoloring temperature of a decolorable colorant used in the second image forming unit, since the sheet passes through the second image forming unit after the sheet is cooled down to a temperature lower than the decoloring temperature, the decolorable colorant will not be decolored.

Moreover, even if the decoloring temperature is higher than the fixing temperature, when a decoloring process is performed on a sheet by the fixing and decoloring device, and a fixing process is subsequently performed to another subsequent sheet by an electrophotographic method, images formed by the electrophotographic method will not have defects resulting from a high-temperature offset or the like since the fixing and decoloring device 8F' is cooled.

In addition, a program that causes a computer constituting an image forming apparatus to execute the above-described operations can be provided as an image forming program. Although the present embodiment was illustrated such that the program for realizing the functions implementing the invention is recorded in advance in a storage region provided in the apparatus, the invention is not limited to this. A similar program may be downloaded to the apparatus from a network, or a similar program stored in a computer-readable recording medium can be installed in the apparatus. The recording medium may be in any form that can store a program and can be read by a computer. Specifically, such recording media may include, for example, internal storage devices arranged within a computer such as ROM and RAM, portable storage media such as CD-ROM, flexible disk, DVD disk, magneto-optical disk and IC card, database which holds computer programs, another computer and its database, and a transmission medium on a network line. The functions that can be acquired in advance by installation and downloading may be realized in cooperation with the OS (operating system) in the apparatus.

A part or an entirety of the program may be an execution module that is dynamically generated.

The invention can be embodied in a variety of other forms without departing from the spirit or major features thereof. Therefore, the embodiments described above are exemplary only in all respects, and are not intended to limit the scope of the invention. The scope of the invention should be defined by the accompanying claims and should not be restricted to the main body of the specification. Furthermore, all changes, various improvements, substitutions and alterations made within the equivalent range of the claims would fall within the scope of the invention.

As described in detail above, according to the invention, it is possible to provide an image forming apparatus capable of reliably reproducing a decolored image even when an image formed with a decolorable colorant is carelessly decolored and disappears.

What is claimed is:

1. An image forming apparatus comprising:
an image data acquiring unit that acquires image data of an image formed on a sheet;
an identification information acquiring unit that acquires identification information that identifies the sheet on which the image is formed;
an image forming unit that forms an image based on the image data acquired by the image data acquiring unit on the sheet with a decolorable colorant which becomes colorless by a predetermined chemical reaction and that forms an identification information image based on the identification information on the sheet with a non-decolorable colorant which does not become colorless by the chemical reaction by which the decolorable colorant becomes colorless; and
a storage control unit that stores the identification information and the image data of the image to be formed on the sheet, on which the identification information image corresponding to the identification information is formed, in a predetermined storage region in a correlated manner.

2. The apparatus according to claim 1,
wherein the image forming unit includes:
a first image forming unit that forms the identification information image on the sheet with the non-decolorable colorant; and
a second image forming unit that forms the image on the sheet with the decolorable colorant.

3. The apparatus according to claim 2,
wherein one of the first and second image forming units is an image forming unit of an ink jet method, and the other image forming unit is an image forming unit of an electrophotographic method, and images are formed by an ink jet method after images are formed by an electrophotographic method.

4. The apparatus according to claim 3,
wherein the first image forming unit is an image forming unit of an electrophotographic method;
wherein the second image forming unit is an image forming unit of an ink jet method, and
wherein the apparatus further comprises:
a fixing and decoloring unit that performs a fixing process of thermally fixing a developer image formed by the first image forming unit to a sheet and performs a decoloring process of decoloring images formed with the decolorable colorant by thermal energy; and
a cooling unit that cools down a sheet subjected to the fixing or decoloring process by the fixing and decoloring unit to a temperature lower than a decoloring temperature at which the decolorable colorant is decolored.

5. The apparatus according to claim 3,
wherein the first image forming unit is an image forming unit of an electrophotographic method;
wherein the second image forming unit is an image forming unit of an ink jet method, and wherein the apparatus further comprises:
a fixing and decoloring unit that performs a fixing process of thermally fixing a developer image formed by the first image forming unit to a sheet and performs a decoloring process of decoloring images formed with the decolorable colorant by thermal energy; and
a cooling unit that cools down the fixing and decoloring unit if images formed on a sheet were decolored by the fixing and decoloring unit.

6. The apparatus according to claim 1, further comprising an identification information image reading unit that reads the identification information image formed on the sheet,
wherein the image forming unit forms an image on a sheet, from which the identification information image is read by the identification information image reading unit, with the decolorable colorant based on the image data acquired by the image data acquiring unit, and
the storage control unit stores the identification information corresponding to the identification information image read by the identification information image reading unit and image data of an image formed on the sheet, from which the identification information image is read, in a correlated manner.

7. The apparatus according to claim 1, further comprising:
an identification information image reading unit that reads an identification information image formed on the sheet; and
a stored image data acquiring unit that acquires image data that is stored to be correlated to the identification information corresponding to the identification information image read by the identification information image reading unit from the predetermined storage region.

8. The apparatus according to claim 7,
wherein the image forming unit forms an image on a sheet based on the image data acquired by the stored image data acquiring unit.

9. The apparatus according to claim 8,
wherein the image forming unit forms the image on the sheet from which an identification information image is read by the identification information image reading unit.

10. The apparatus according to claim 1, further comprising:
an identification information image reading unit that reads an identification information image formed on the sheet;
a sheet sorting control unit that performs control so that sheets are transported to a first sheet storage unit if the identification information image is read by the identification information image reading unit, and sheets are transported to a second sheet storage unit if the identification information image is not read; and
a sheet sorting unit that sorts sheets based on the control of the sheet sorting control unit.

11. An image forming method comprising:
acquiring image data of an image formed on a sheet;
acquiring identification information that identifies the sheet on which the image is formed;
forming an image based on the acquired image data on the sheet with a decolorable colorant which becomes colorless by a predetermined chemical reaction and forming an identification information image based on the identification information on the sheet with a non-decolorable colorant which does not become colorless by the chemical reaction by which the decolorable colorant becomes colorless; and
storing the identification information and the image data of the image to be formed on the sheet, on which the identification information image corresponding to the identification information is formed, in a predetermined storage region in a correlated manner.

12. The method according to claim 11, further comprising:
reading the identification information image formed on the sheet;
forming an image on the sheet, from which the identification information image is read, with the decolorable colorant based on the acquired image data; and
storing the identification information corresponding to the read identification information image and image data of an image to be formed on the sheet, from which the identification information image is read, in a correlated manner.

13. The method according to claim 11, further comprising:
reading the identification information image formed on the sheet; and
acquiring image data that are stored to be correlated to the identification information corresponding to the read identification information image from the predetermined storage region.

14. The method according to claim 13,
wherein an image is formed on a sheet based on the image data acquired from the predetermined storage region.

15. The method according to claim 14,
wherein the image is formed on the sheet from which the identification information image is read.

16. The method according to claim 11, further comprising:
reading the identification information image formed on the sheet; and
transporting sheets to a first sheet storage unit if the identification information image is read and transporting sheets to a second sheet storage unit if the identification information image is not read, thus sorting the sheets.

17. A non-transitory computer-readable recording medium having an image forming program recorded therein, the program causing a computer to execute processing comprising:
acquiring image data of an image formed on a sheet;
acquiring identification information that identifies the sheet on which the image is formed;
performing control to form an image based on the acquired image data on the sheet with a decolorable colorant which becomes colorless by a predetermined chemical reaction and to form an identification information image based on the identification information on the sheet with a non-decolorable colorant which does not become colorless by the chemical reaction by which the decolorable colorant becomes colorless; and
storing the identification information and the image data of the image to be formed on the sheet, on which the identification information image corresponding to the identification information is formed, in a predetermined storage region in a correlated manner.

18. The non-transitory computer-readable recording medium according to claim 17, wherein the processing further comprises:
reading the identification information image formed on the sheet;
performing control to form an image on the sheet, from which the identification information image is read, with the decolorable colorant based on the acquired image data; and
storing the identification information corresponding to the read identification information image and image data of an image to be formed on the sheet, from which the identification information image is read, in a correlated manner.

19. The non-transitory computer-readable recording medium according to claim 17, wherein the processing further comprises:
reading the identification information image formed on the sheet; and
acquiring image data that are stored to be correlated to the identification information corresponding to the read identification information image from the predetermined storage region.

20. The non-transitory computer-readable recording medium according to claim 17, wherein the processing further comprises:
reading the identification information image formed on the sheet; and
performing control so that sheets are transported to a first sheet storage unit if the identification information image is read and sheets are transported to a second sheet storage unit if the identification information image is not read, thus sorting the sheets.

* * * * *